United States Patent
Ghosh et al.

(10) Patent No.: US 10,758,840 B2
(45) Date of Patent: Sep. 1, 2020

(54) LATERALLY-FED MEMBRANE CHROMATOGRAPHY DEVICE

(71) Applicant: McMaster University, Hamilton (CA)

(72) Inventors: Raja Ghosh, Dundas (CA); Pedram Madadkar, Hamilton (CA)

(73) Assignee: MCMASTER UNIVERSITY, Hamilton (CA)

( * ) Notice: Subject to any disclaimer, the term of this patent is extended or adjusted under 35 U.S.C. 154(b) by 0 days.

(21) Appl. No.: 15/947,361

(22) Filed: Apr. 6, 2018

(65) Prior Publication Data
US 2018/0236378 A1    Aug. 23, 2018

Related U.S. Application Data

(63) Continuation-in-part of application No. 15/452,157, filed on Mar. 7, 2017.
(Continued)

(51) Int. Cl.
*B01D 15/00* (2006.01)
*B01D 15/22* (2006.01)
(Continued)

(52) U.S. Cl.
CPC ............. *B01D 15/00* (2013.01); *B01D 15/22* (2013.01); *B01D 15/30* (2013.01); *B01D 15/362* (2013.01);
(Continued)

(58) Field of Classification Search
CPC ........ B01D 15/18; B01D 15/22; B01D 15/30; B01D 15/362; B01D 15/426;
(Continued)

(56) References Cited

U.S. PATENT DOCUMENTS 4,414,172 A * 11/1983 Leason ................ B01D 29/012
                                                          210/445
5,059,654 A * 10/1991 Hou ................. A61K 39/39525
                                                          210/198.2
(Continued)

OTHER PUBLICATIONS

Ghosh, "Protein Separation using membrane chromatography: opportunities and challenges", J. Chromatogr. A., 952 (2002) 13-27.
(Continued)

*Primary Examiner* — Katherine Zalasky McDonald
(74) *Attorney, Agent, or Firm* — Bereskin & Parr LLP/S.E.N.C.R.L., S.R.L.

(57) ABSTRACT

A method of forming a frame around a membrane stack for a laterally-fed membrane chromatography device is provided. The method includes placing a membrane stack having one or more membrane layers on a bottom surface of body of a master mold, the body having opposed side walls and opposed end walls, the opposed side walls spaced apart by a distance greater than a length of the membrane stack, the opposed end walls spaced apart by a distance greater than a width of the membrane stack; placing a cap on the body of the master mold to enclose the membrane stack in the master mold, the cap having at least one opening for injecting a material into a space defined by the end walls of the master mold, the side walls of the master mold, end walls of the membrane stack side walls of the membrane stack, the bottom surface of the body and an inner surface of the cap; injecting the material into the space around the membrane stack; and curing the material to form a frame around the membrane stack.

12 Claims, 36 Drawing Sheets

Related U.S. Application Data

(60) Provisional application No. 62/304,379, filed on Mar. 7, 2016.

(51) Int. Cl.
  *B01D 15/42* (2006.01)
  *B01D 65/00* (2006.01)
  *G01N 30/60* (2006.01)
  *B01D 63/08* (2006.01)
  *B01D 71/34* (2006.01)
  *B01D 15/30* (2006.01)
  *B01D 15/36* (2006.01)
  *G01N 30/52* (2006.01)
  *B33Y 80/00* (2015.01)

(52) U.S. Cl.
  CPC ......... *B01D 15/426* (2013.01); *B01D 63/082* (2013.01); *B01D 65/003* (2013.01); *B01D 71/34* (2013.01); *G01N 30/52* (2013.01); *G01N 30/6086* (2013.01); *B01D 2313/04* (2013.01); *B01D 2313/20* (2013.01); *B01D 2323/02* (2013.01); *B01D 2325/42* (2013.01); *B33Y 80/00* (2014.12); *G01N 2030/527* (2013.01)

(58) Field of Classification Search
  CPC .... B01D 15/147; B01D 63/082; B01D 63/08; B01D 2325/42; B01D 2313/10; B01D 2313/105; B01D 2313/12; B01D 2313/125; B01D 2313/40; G01N 30/6086; G01N 30/6065; G01N 30/6052; G01N 30/60; G01N 30/6017; G01N 30/6091; G01N 30/38; G01N 30/386; G01N 2030/527; B29C 45/001; B29C 45/14; B29C 45/14008; B29C 45/14065; B29C 45/14819; B29C 45/14778; B29C 45/14795; B29C 45/14811; B29C 45/40; B29C 45/65; B29C 2045/14131; B29C 2045/14942; B29C 33/002; B29C 33/0038; B29C 33/0061; B29C 33/0066; B29C 33/20; B29C 33/12; B29C 33/123; B29C 33/301; B29C 33/305; B29C 33/307; B29C 35/16
  See application file for complete search history.

(56) References Cited

U.S. PATENT DOCUMENTS

| | | | | | |
|---|---|---|---|---|---|
| 5,429,742 | A * | 7/1995 | Gutman | ............... | B01D 25/001 210/321.75 |
| 5,723,047 | A * | 3/1998 | Turnbull | ............... | B01D 29/012 210/445 |
| 6,030,539 | A * | 2/2000 | Zuk, Jr. | ............... | A61M 1/3627 210/188 |
| 6,528,322 | B1 * | 3/2003 | Carlsson | ............... | G01N 30/94 204/400 |
| 6,565,752 | B1 * | 5/2003 | Baron | ............... | F04B 43/043 210/175 |
| 8,394,551 | B2 * | 3/2013 | Zuber | ............... | C25B 9/10 429/483 |
| 8,506,802 | B1 * | 8/2013 | de Los Reyes | ............... | B01D 15/22 210/198.2 |
| 10,195,550 | B2 * | 2/2019 | Steen | ............... | B01D 29/52 |
| 2003/0052054 | A1 * | 3/2003 | Pearl | ............... | B01D 63/00 210/500.21 |
| 2004/0000519 | A1 * | 1/2004 | Jiang | ............... | G01N 30/0005 210/634 |
| 2004/0011648 | A1 * | 1/2004 | Paul | ............... | B01D 61/18 204/450 |
| 2005/0014056 | A1 * | 1/2005 | Zuber | ............... | C25B 9/10 429/456 |
| 2005/0202557 | A1 * | 9/2005 | Borenstein | ............... | A61M 1/1678 435/369 |
| 2009/0266756 | A1 * | 10/2009 | Fischer-Fruehholz | ............... | B01D 63/10 210/321.83 |
| 2012/0074051 | A1 * | 3/2012 | Gebauer | ............... | G01N 30/6017 210/198.2 |
| 2012/0118730 | A1 * | 5/2012 | Liang | ............... | B01D 61/48 204/269 |
| 2012/0168369 | A1 * | 7/2012 | Van Medevoort | ... | B01D 63/084 210/335 |
| 2012/0223015 | A1 * | 9/2012 | Browning | ............... | A61M 1/16 210/646 |
| 2012/0234749 | A1 * | 9/2012 | Maier | ............... | B01D 29/111 210/493.2 |
| 2014/0197101 | A1 * | 7/2014 | Harjes | ............... | A61M 1/16 210/637 |
| 2014/0339170 | A1 * | 11/2014 | de Los Reyes | ............... | B01D 15/206 210/656 |
| 2017/0182433 | A1 * | 6/2017 | de Los Reyes | ............... | B01D 15/22 |
| 2017/0252672 | A1 * | 9/2017 | Ghosh | ............... | B01D 15/22 |
| 2017/0349626 | A1 * | 12/2017 | Ghosh | ............... | B01D 15/18 |
| 2018/0236378 | A1 * | 8/2018 | Ghosh | ............... | B01D 15/1885 |

OTHER PUBLICATIONS

Avramescu et al., "Dynamic Behaviour of Adsorber Membranes for Protein Recovery", Biotechnol. Bioeng., 84 (2003) 564-72.

Orr et al., "Recent advances in bioprocessing application of membrane chromatography", Biotechnol. Adv., 31 (2013) 450-65.

Madadkar et al., "High-resolution, preparative purification of PEGylated protein using a laterally-fed membrane chromatography device", J. Chromatogr. B, 1035 (2016) 1-7.

Tennikova et al., "High-performance membrane chromatography. A novel method of protein separation", J. Liq. Chromatogr., 13(1) (1990) 63-70.

Suen et al., "Sorption kinetics and breakthrough curves for pepsin and chymosin using pepstatin A affinity membranes", J. Chromatogr. A., 686 (1994) 179-92.

Ghosh, "Separation of proteins using hydrophobic interaction membrane chromatography", J. Chromatogr. A., 923 (2001) 59-64.

Charcosset, "Purification of Proteins by Membrane Chromatography", J. Chem. Technol. Biotechnol., 71 (1998) 95-110.

Bhut et al., "Membrane chromatography: Protein purification from E. coli lysate using newly designed and commercial anion-exchange stationary phases", J. Chromatogr. A., 1217 (2010) 4946-57.

Liu et al., Breakthrough of Lysozyme through an Affinity Membrane of Cellulose-Cibacron Blue, AICHE J., 40 (1994) 40-49.

Suen et al., "A mathematical analysis of affinity membrane bioseparations", Chem. Eng. Sci., 47 (1992) 1355-1364.

Klein et al., "Affinity adsorption devices prepared from microporous poly(amide) hollow fibers and sheet membranes", J. Membr. Sci., 129 (1997) 31-46.

Gebauer et al., "Breakthrough performance of high-capacity membrane adsorbers in protein chromatography", Chem. Eng. Sci., 52 (1997) 405-419.

Van Reis et al., "Membrane separations in biotechnology", Curr. Opin. Biotechnol., 12 (2001) 208-11.

Nojima et al., "The pH-Dependent Formation of PEGylation Bovine Lactoferrin by Branched Polyethylene Glycol (PEG)-N-hydroxysuccinimide (NHS) Active Esters", 32 (2009) 523-526.

Demmer et al., "Large-scale membrane adsorber", J. Chromatogr. A., 852 (1999) 73-81.

Ghosh et al., "Effect of module design on the efficiency of membrane chromatographic separation processes", J. Memb. Sci., 281 (2006) 532-540.

Sarfert et al., "Mass transfer limitations in protein separations using ion-exchange membranes", J. Chromatogr. A., 764 (1997) 3-20.

Francis et al., "Zonal Rate Model for Stacked Membrane Chromatography Part II: Characterizing Ion-Exchange Membrane Chroma-

(56) References Cited

OTHER PUBLICATIONS tography under Protein Retention Conditions", Biotechnology and Bioengineering, vol. 109, No. 3, Mar. 2012.

Ghosh et al., "Computational fluid dynamic simulation of axial and radial flow membrane chromatography: Mechanisms of non-ideality and validation of the zonal rate model" J. Chromatogr. A., 1305 (2013) 114-22.

Boi, "Membrane adsorbers as purification tools for monoclonal antibody purification", J. Chromatogr. B., 848 (2007) 19-27.

Dimartino et al., Influence of protein adsorption kinetics on break-through broadening in membrane affinity chromatography, J. Chromatogr. A., 1218 (2011) 3966-72.

Madadkar et al., "A laterally-fed membrane chromatography module", J. Membr. Sci., 487 (2015) 173-179.

Madadkar et al., "High-resolution protein separation using a laterally-fed membrane chromatography device", J. Membre. Sci., 499 (2016) 126-133.

Fee, "PEG-proteins: Reaction engineering and separation issues", J. Chem. Eng. Sci., 61, No. 3, (2006) 924-939.

Yu et al., "Purification of PEGylated Protein using Membrane Chromatography", J. Pharm. Sci., 99, No. 8, (2010) 3326-3333.

Moosmann et al., "Analytical and preparative separation of PEGylated lysozyme for the characterization of chromatography media", J. Chromatogr. A., 1217, No. 2, (2010) 209-215.

Maiser et al., "Isoform separation and binding site determination of mono-PEGylated lysozyme with pH gradient chromatography", J. Chromatogr. A., 1268 (2012) 102-108.

Shukla et al., "Downstream processing of monoclonal antibodies—Application of platform approaches", J. Chromatogr. B., 848, No. 1, (2007) 28-39.

Vazquez-Rey et al., "Aggregates in Monoclonal Antibody Manufacturing Processes", Biotechnol. Bioeng, 108, No. 7, (2011) 1494-1508.

Wang et al., "Fractionation of monoclonal antibody aggregates using membrane chromatography", J. Membr. Sci. 318, No. 1-2, (2008) 311-316.

Sadavarte et al., "Purification of Chimeric Heavy Chain Monoclonal Antibody EG2-hFc using Hydrophobic Interaction Membrane Chromatography: An Alternative to Protein-A Affinity Chromatography", Biotechnol. Bioeng., 111, No. 6, (2014) 1139-1149.

Fekete et al., "Ultra-high-performance liquid chromatography for the characterization of therapeutic proteins", TrAC—Trends Anal. Chem., 63 (2014) 76-84.

Kuczewski et al., "Development of a Polishing Step Using a Hydrophobic Interaction Membrane Adsorber with a PER.C6-Derived Recombinant Antibody", Biotechnology and Bioengineering, vol. 105, No. 2, Feb. 1, 2010.

Zhou et al., "Membrane Chromatography as a Robust Purification System for Large-Scale Antibody Production", BioProcess International, Sep. 2005, 33-37.

Lim et al., "Economic Benefits of Single-Use Membrane Chromatography in Polishing", BioProcess International, Feb. 2007.

Mora et al., "Disposable Membrane Chromatography", BioProcess International, Jun. 2006, 38-43.

Muthukumar et al., "Economic benefits of membrane chromatography versus packed bed column purification of therapeutic proteins expressed in microbial and mammalian hosts", J. Chem. Technol. Biotechnol., 2017, 92, 59-68.

Muthukumar et al., "High throughput process development (HTPD) platform for membrane chromatography", Journal of Membrane Science, 442 (2013) 245-253.

Von Lieres et al., "Model Based Quantification of Internal Flow Distributions from Breakthrough Curves of Flat Sheet Membrane Chromatography Modules", Chem. Eng. Technol., 1010, 33, No. 6, 960-968.

Teeters et al., "Performance and scale-up of adsorptive membrane chromatography", Journal of Chromatography A. 944 (2002) 129-139.

Brand et al., "A novel approach for lysozyme and ovotransferrin fractionation from egg white by radial flow membrane adsorption chromatography: Impact of produce and process variables", Separation and Purification Technology, 161 (2016) 44-52.

Hagiwara et al., "High-performance purification of gelsolin from plasma using anion-exchange porous hollow-fiber membrane", Journal of Chromatography B, 821 (2005) 153-158.

Bower et al., "Elimination of non-uniform, extra device flow effects in membrane adsorbers", Journal of Membrane Science, 330 (2009) 379-387.

He et al., "Preparation and characterization of porous anion-exchange membrane adsorbers with high protein-binding capacity", Journal of Membrane Science, 315 (2008) 155-163.

* cited by examiner

LATERALLY-FED MEMBRANE CHROMATOGRAPHY DEVICE

TECHNICAL FIELD

The following relates to a membrane chromatography device and more specifically to a laterally-fed membrane chromatography device.

BACKGROUND

Membrane chromatography is a relatively new purification technique which involves the use of a stack of synthetic membranes as chromatographic media. Membrane chromatography is emerging as a fast and cost-effective alternative to resin-based column chromatography.

One attractive feature of membrane chromatography is the speed of separation. The predominantly convection-based transport of target bio-molecules to and from their binding sites on a membrane, as opposed to the largely diffusion-limited mass transport of these molecules within the resin bed makes membrane chromatography significantly faster. Membrane chromatography could therefore be faster by more than one order of magnitude, a factor which contributes towards higher productivity and decrease in product degradation by proteolysis, denaturation and aggregation.

The predominance of convection-based transport of target bio-molecules also makes it easier to model membrane chromatography. Also, in membrane chromatography, the efficiency of binding of even large solutes such as monoclonal antibodies is relatively independent of the superficial velocity. This offers significant flexibility in process design. Other advantages include lower buffer usage and pressure drops, and the absence of problems such as channeling and fracturing of resin beds. Moreover, the disposable nature of membrane devices eliminates the need for cleaning and validation steps, and thereby contributes toward practicality and ease of use.

The efficiency of membrane chromatography is critically dependent on the fluid flow distribution within the membrane device. Membrane chromatography devices are commonly available in two formats: a) stacked discs, and b) radial flow. Both types of devices suffer from poor flow distribution which can lead to shallow breakthrough and consequently poor binding capacity utilization.

Existing stacked disc devices often resemble syringe-type micro-filters that are relatively easy to fabricate and are used for preliminary process development work. Stacked disks typically have large radial to axial dimension ratios. The feed enters at a location corresponding to the center of the first disk, while the flow-through is collected from the center of the last membrane in the stack. Consequently, the central region of the stack gets saturated with solute much earlier than the peripheral regions leading to poor breakthrough binding capacities. Radial flow devices have complicated design, and are used for large-scale purification. They have large dead volumes on both feed and permeate side, and a large central core for supporting the membrane, and therefore extremely poor device volume utilization.

SUMMARY

In one aspect, a method of forming a frame around a membrane stack for a laterally-fed membrane chromatography device is provided. The method includes placing a membrane stack having one or more membrane layers on a bottom surface of body of a master mold, the body having opposed side walls and opposed end walls, the opposed side walls spaced apart by a distance greater than a length of the membrane stack, the opposed end walls spaced apart by a distance greater than a width of the membrane stack; placing a cap on the body of the master mold to enclose the membrane stack in the master mold, the cap having at least one opening for injecting a material into a space defined by the end walls of the master mold, the side walls of the master mold, end walls of the membrane stack side walls of the membrane stack, the bottom surface of the body and an inner surface of the cap; injecting the material into the space around the membrane stack; and curing the material to form a frame around the membrane stack.

In some other embodiments, the method further includes removing the cap piece and the master mold from the membrane stack and frame.

In some other embodiments, the curing the material includes cooling the material below a curing temperature.

In some other embodiments, the material is a thermoplastic polymer that is injected into the master mold as a liquid and hardens when cooled.

In some other embodiments, the curing the material exposing the material to ultraviolet light.

In some other embodiments, the placing the cap on the body of the master mold includes resting the inner surface of the cap on a top surface of the membrane stack.

In some other embodiments, the placing the cap on the body of the master mold includes resting the inner surface of the cap on an abutment member of the body to support the cap above a top surface of the membrane stack.

In some other embodiments, the placing the membrane stack on the bottom surface of the body includes coupling the membrane stack to the bottom surface of the body.

In some other embodiments, the placing the membrane stack on the bottom surface of the body includes placing the membrane stack between retention ridges of the body to couple the membrane stack to the body.

In some other embodiments, the placing the membrane stack on the bottom surface of the master mold includes positioning the membrane stack on the bottom surface so the end walls of the membrane stack are adjacent to the end walls of the body and the side walls of the membrane stack are adjacent to the side walls of the body.

In some other embodiments, during the injecting the material into the space around the membrane stack, the material is contained within the space around the membrane stack.

In some other embodiments, during the curing of the material, the material adheres to the side wall and end walls of the membrane stack to form a frame around the membrane stack.

In another aspect, a membrane stack and frame formed by a method provided herein is provided.

In another aspect, a laterally-fed membrane chromatography device having a membrane stack and frame formed by a method provided herein is provided.

Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

The drawings included herewith are for illustrating various examples of articles, methods, and apparatuses of the present specification. In the drawings.

DETAILED DESCRIPTION

Various apparatuses or processes will be described below to provide an example of each claimed embodiment. No embodiment described below limits any claimed embodiment and any claimed embodiment may cover processes or materials that differ from those described below. The claimed embodiments are not limited to materials or processes having all of the features of any one material or process described below or to features common to multiple or all of the materials described below. It is possible that a material or process described below is not covered by any of the claimed embodiments. Any embodiment disclosed below that is not claimed in this document may be the subject matter of another protective instrument, for example, a continuing patent application, and the applicants, inventors or owners do not intend to abandon, disclaim or dedicate to the public any such embodiment by its disclosure in this document.

It will be understood that the terms "top" and "bottom" referred to herein are used in the context of the attached Figures. The terms are not necessarily reflective of the orientation of the laterally-fed membrane chromatography device in actual use and are therefore not meant to be limiting in their use herein.

Described herein are various embodiments for a laterally-fed membrane chromatography device that provides for the removal of a solute from a fluid. The device houses a stack of flat sheet adsorptive membranes. Fluid enters the device at an inlet positioned at a first end of the device and is distributed laterally over a first side of a membrane stack positioned at the first end of the device. The fluid then enters the membrane stack at different locations along its length and flows through the membrane stack in a direction normal to a top surface of a top membrane of the membrane stack. The fluid emerges from the membrane stack at a bottom surface of a bottom membrane of the membrane stack and flows laterally with respect to the bottom surface of the bottom membrane of the membrane stack over a second side of the membrane stack until it is collected at the device outlet positioned at a second end of the device. The lateral-flows on both sides (e.g. the direction of travel of the fluid over the first side and over the second side of the membrane stack) are parallel to each other.

Figure 1:
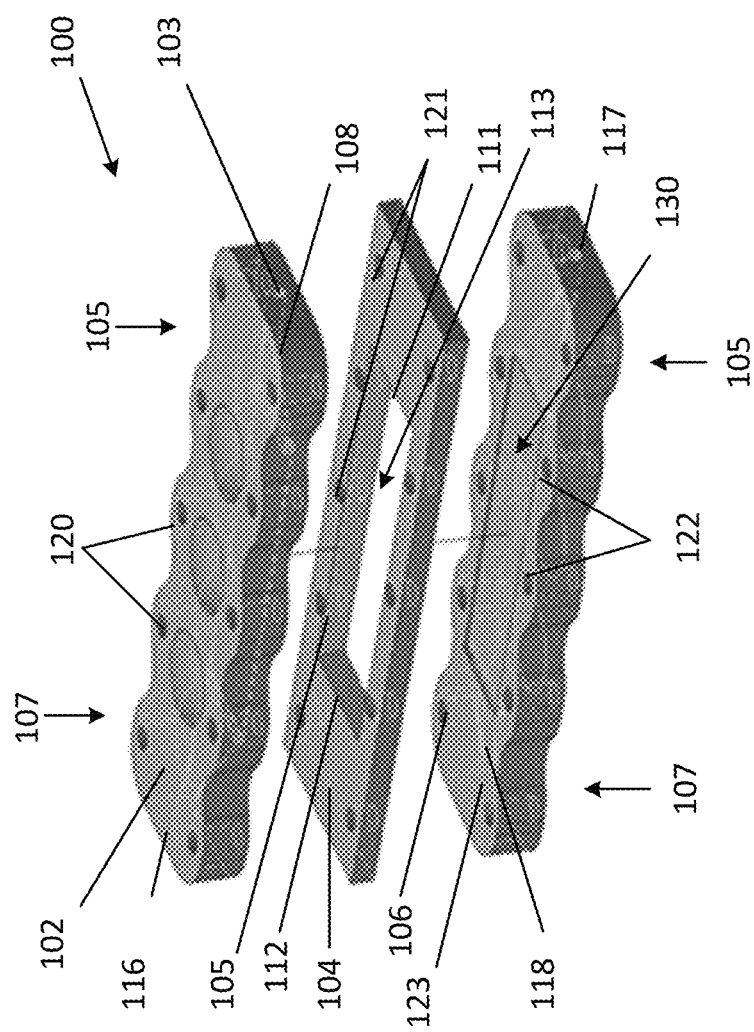
FIG. 1 is a schematic diagram showing an exploded perspective view of one embodiment of a laterally-fed membrane chromatography device.

Turning to the Figures, FIG. 1 shows one embodiment of a laterally fed membrane chromatography device 100 according to one example. The membrane chromatography device 100 comprises three bodies (e.g. plates): a top plate 102, a middle plate (e.g. frame) 104 and a bottom plate 106.

Top plate 102 is positioned superior to (e.g. on top of when device 100 is in its normal configuration, as shown in FIG. 1) both middle plate 104 and bottom plate 106. Top plate 102 defines an inlet 103 for receiving a fluid at a first end 105 of device 100. In the embodiment shown in FIG. 1, inlet 103 is positioned at a first end 105 of device 100 such that a fluid entering device 100 is received by inlet 103 and travels through inlet 103 in a direction transverse to a direction of flow of the fluid through the membrane.

In the example shown in FIG. 1, a fluid can be provided to the membrane chromatography device 100 through an inlet 103. Inlet 103 can be a port and is in fluid communication with first (e.g. top) channel 108 such that fluid entering the membrane chromatography device 100 is directed towards membrane stack 109 via first channel 108. Further, inlet 103 extends from an outer surface of device 100 through top plate 102 to direct fluid from a position outside of the device 100 towards membrane stack of chromatography device 100.

As a fluid enters inlet 103 it is carried towards a leading edge 111 of membrane stack 109 (not shown) by top channel 108. Top channel 108 (shown in FIG. 1 as a dotted line) is fluidly connected to inlet 103 and carries fluid from inlet 103 towards membrane stack 109 (not shown). As such, inlet 103 is upstream of top channel 108 and top channel 108 is upstream of membrane stack 109. The term upstream can be defined as direction of fluid flow experienced by (i.e. away from) a position on a flow pathway (i.e. channel or through membrane stack) relative to the direction experienced by (i.e. towards) another position on the same flow pathway (i.e. channel or through membrane stack). For example, a location A of a flow pathway (e.g. top channel 108) is considered upstream of a relative location B of the same flow pathway if, at location A, fluid is flowing away from location A and towards location B.

Accordingly, the term downstream can be defined as direction of fluid flow experienced by (i.e. towards) a position on a flow pathway (i.e. channel or through membrane stack) relative to the direction experienced by (i.e. away from) another position on the same flow pathway (i.e. channel or through membrane stack). For example, a location A of a flow pathway (e.g. top channel 108) is considered downstream of a relative location B of the same flow pathway if, at location A, fluid is flowing towards location A from location B.

In the embodiment shown in FIG. 1, top channel 108 is defined by top plate 102 (e.g. is embedded in top plate 102 and formed by top plate 102). It should be noted that in the embodiment shown in FIG. 1, inlet 103 is positioned such that fluid entering device 100 via inlet 103 is carried by top channel 108 towards membrane stack 109 (not shown) in a direction that is transverse to a direction of flow of the fluid through membrane stack 109. Put another way, in the embodiment shown in FIG. 1, as a fluid is received by inlet 103, the fluid has a direction of flow that is lateral to (e.g. across) a direction of flow of the fluid through the membrane of device 100.

Top plate 102 can optionally have a vent 116 to vent the device 100 (e.g. remove air bubbles therein) when not in normal operation. Top plate 102 can also optionally have a plurality of apertures 120 for securing top plate 102 to middle plate 104 and bottom plate 106. Top plate 102 can be secured to middle plate 104 and bottom plate 106 in any appropriate manner (e.g. screws, bolts, pins, adhesives, etc.).

Middle plate 104 is positioned between top plate 102 and bottom plate 106 (e.g. middle plate is positioned inferior (e.g. below). Middle plate 104 is downstream of top plate 102 and upstream of bottom plate 106. Middle plate 104 defines space 113 for holding (e.g. housing) membrane stack 109 (not shown).

Middle plate 104 has an inner wall 105 defining a cavity 113 for holding a membrane stack 109. Membrane stack 109 has a leading edge 111 and a trailing edge 112. Leading edge 111 of membrane stack 109 is an edge of a top surface of a top membrane of membrane stack 109 that receives the fluid from channel 108 (e.g. is fluidly coupled to channel 108) at first end 105 of device 100. Trailing edge 112 of membrane stack 109 is an edge of a bottom surface of a bottom membrane of membrane stack 109 that distributes the fluid from the membrane stack 109 to second (e.g. bottom) channel 118 (e.g. is fluidly coupled to channel 118) at second end 107 of device 100.

Figure 2:
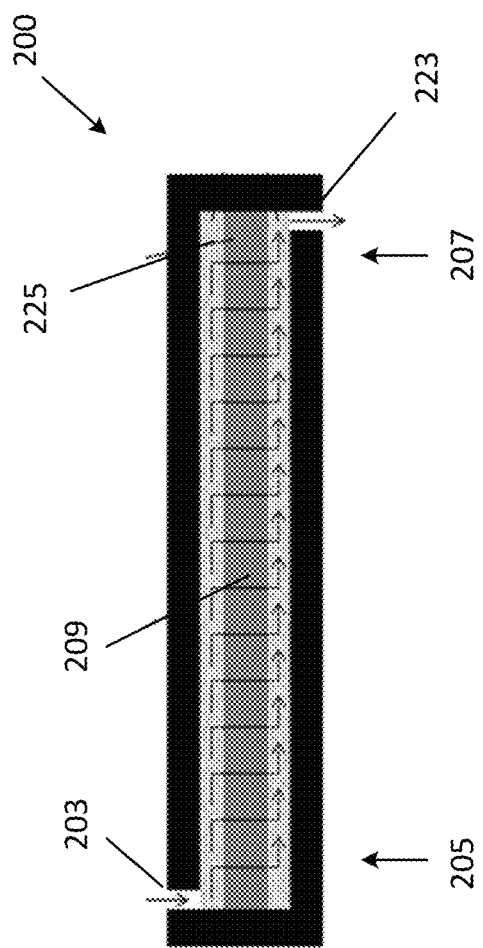
FIG. 2 is a schematic diagram showing a cross-sectional view of a laterally-fed membrane chromatography device illustrating flow of a fluid through the device.

As fluid travels along channel 108 and approaches membrane stack 109, the fluid exits channel 108 and is distributed laterally over a top surface (see for example top surface 225 of device 200 of FIG. 2) of a top membrane of the membrane stack 109. The direction of flow of the fluid changes as it enters (e.g. falls through) the membrane stack 109 to a direction of flow that is transverse (e.g. orthogonal) to the direction of flow of fluid along channel 108. The fluid enters membrane stack 109 at different locations along a length and a width of membrane stack 109 (e.g. at different locations along a length and a width of the top surface of the top membrane of membrane stack 109). The direction of flow of the fluid changes again as it exits the membrane stack 109 to a direction of flow that is transverse (e.g. orthogonal) to the direction of flow of fluid through the membrane stack 109. The fluid enters membrane stack 109 at different locations along a length and a width of membrane stack 109 (e.g. at different locations along a length and a width of the top surface of the top membrane of membrane stack 109) and exits membrane stack 109 at different locations along a length and a width of membrane stack 109 (e.g. at different locations along a length and a width of the bottom surface of the bottom membrane of membrane stack 109). An exemplary flow path of the fluid through membrane stack 109 is shown in FIG. 2. In one example, the flow of the fluid through membrane stack 109 is in a direction normal to a plane defined by the top surface of the top membrane of the membrane stack 109. In one example, the middle plate 104 can be made of Delrin® (Dupont).

Membrane stack 109 can comprise one or more membrane sheets. The device 100 (see FIG. 2) is designed to house a stack of rectangular flat sheet adsorptive membranes 109. Each membrane sheet of stack 109 can be any flat sheet adsorptive membrane appropriate for chromatography applications. For example, the membrane stack 109 may be appropriate for protein separation. Membrane stack 109 can be incorporated into device 100 in any appropriate manner. In one specific example, standard PEEK fittings can be employed to integrate the membrane chromatography device with an AKTA Prime liquid chromatography system (GE Healthcare Bioscience, QC, Canada). In one example, the membrane stack comprises at least one hydrophilized poly(vinylidene fluoride) (PVDF) membrane. Also, membrane stack 109 can have a thickness greater than a thickness of middle plate 104 to provide that the device 100 is sealed when the plates 102, 104, 106 are sandwiched together (e.g. when device 100 is assembled).

Figure 3:
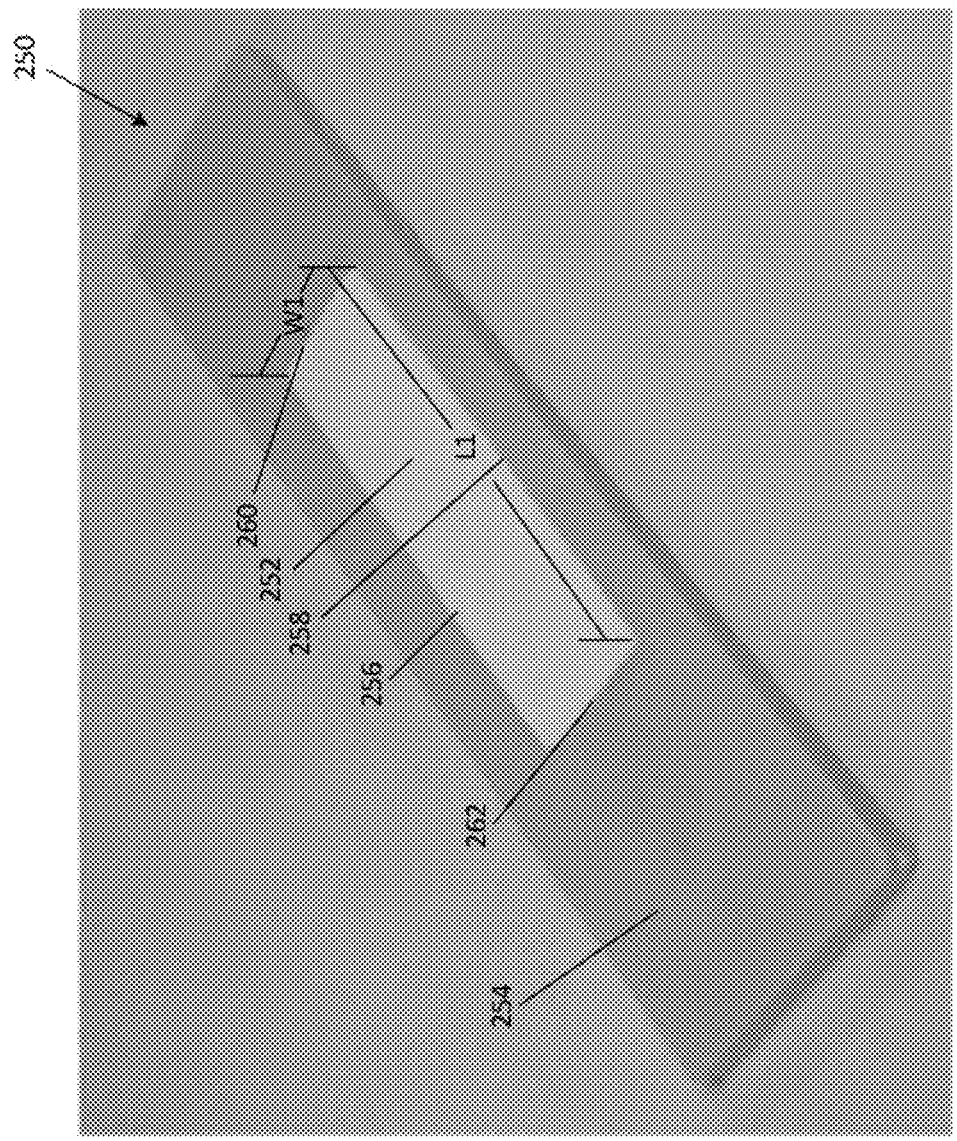
FIG. 3 is a perspective view of a membrane stack and a frame, according to one embodiment.

In some embodiments, the membrane stack (e.g. membrane stack 109) can be assembled into a module (for example but not limited to middle plate 104) for use in a laterally-fed membrane chromatography device by forming a frame around the membrane stack. A perspective view of one exemplary module 250 having a membrane stack 252 and a frame (or gasket) 254 is shown in FIG. 3.

Membrane stack 252, as described previously, can be held by a frame 254 that substantially surrounds side and/or end surfaces of the membrane stack 252. In the embodiments shown in the Figures, side surfaces 256, 258 and end surfaces 260, 262 of membrane stack 252 are surrounded by frame 254 and the top surface of the top membrane and the bottom surface of the bottom membrane remain open to receive and provide, respectively, the fluid filtered by the membrane stack 252. The person skilled in the art will understand that membrane stack 252 may have any desired shape (for example but not limited to a circular shape, a square shape, a rectangular shape, etc.) and frame 254 can be configured to surround any side and/or end surfaces of the membrane stack while the top surface of the top membrane and the bottom surface of the bottom membrane remain open to receive and provide, respectively, the fluid filtered by the membrane stack 252.

Module 250 is configured so that the fluid is directed (for example but not limited to from top plate 102) through the membrane stack 252 in a fluid path that is substantially perpendicular to a plane defined by the top surface of the top membrane of the membrane stack 252 and/or to a plane defined by the bottom surface of the bottom membrane of the membrane stack 252. Frame 254 of module 250 is configured to contain or carry the membrane stack 252 and to constrain the flow of the fluid to within the membrane stack 252 such that all, or a desired portion, of the fluid flow passes through the membrane stack 252 and does not escape around the membrane stack 252. Accordingly, frame 254 may be substantially impermeable to the fluid.

Membrane stack 252 may be integrally molded such that the membrane sheets of the membrane stack 252 are a single unit. In one example, membrane stack 252 may be of the form of a flat disk. As discussed above, membrane stack 252 can be joined to a feed/distributor system such as but not limited to top plate 102 and bottom plate 106 to form a membrane chromatography device 100. As shown in FIG. 3, membrane stack 252 has a length L1 and a width W1.

Figure 4:
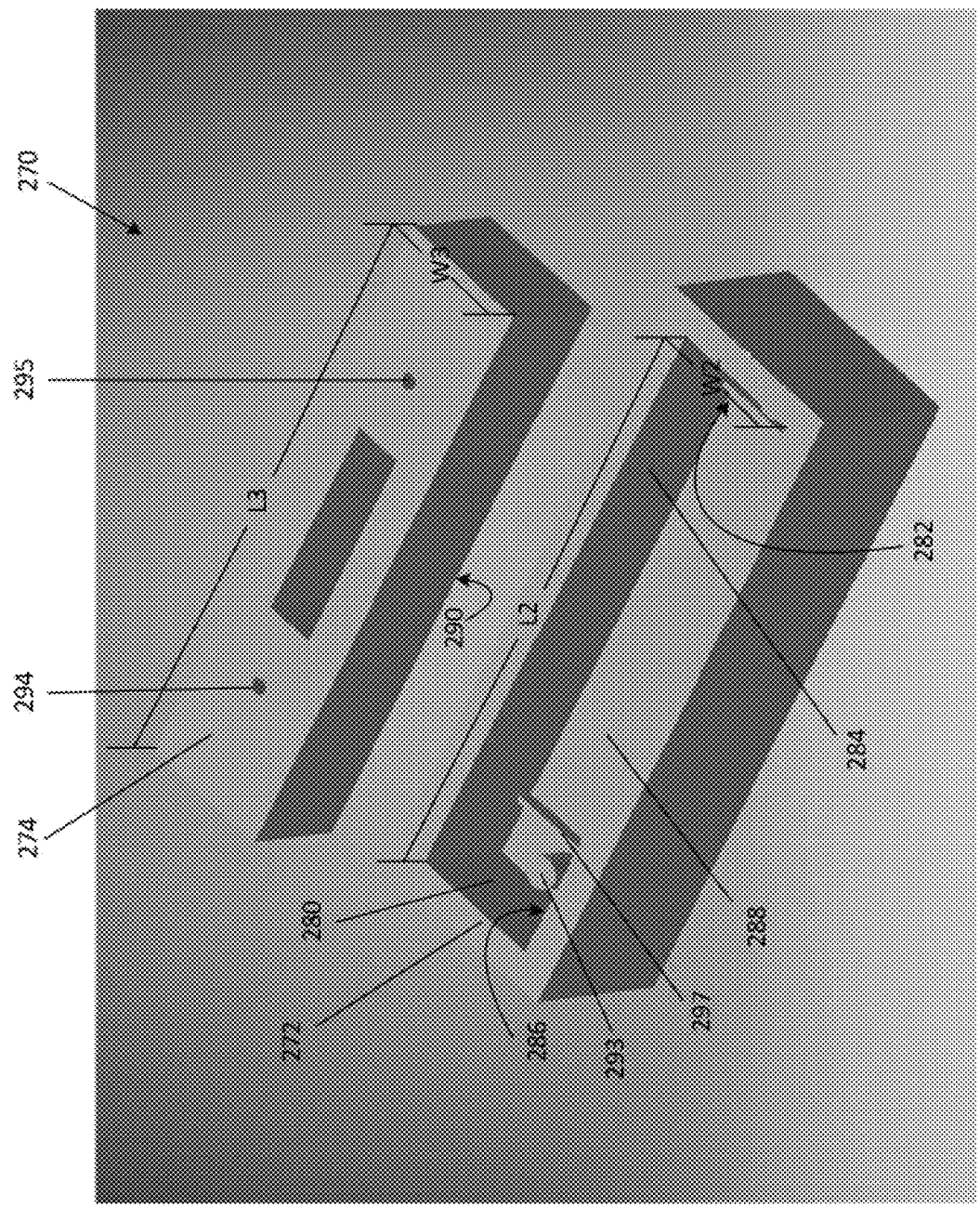
FIG. 4. is an exploded perspective view of a master mould having a cap and a body, according to one embodiment.

Frame 254 may be made of a polymeric material that is injectable into the space 408 as a liquid and then curable into a solid. For example, frame 254 may be made of a thermoplastic polymer that is liquid when warm and cools to form a solid material. For example, frame 254 extends form the outer side sand end surfaces of the membrane stack To form a frame 254 around membrane stack 252, a master mold may be used. As shown in FIG. 4, a master mold 270 may have two parts: a body 272 for housing the membrane stack 252 and cap 274 for sealing the membrane stack 252 in the body 272. Body 272 has opposed inner end surfaces 280 and 282 spaced apart by a distance L2 and opposed inner side surfaces 284 and 286 spaced apart by a distance W2.

Cap 274 has at least one opening 294 for receiving the polymeric material into the enclosed space 278 for forming the frame 257 around the membrane stack 252. Cap 274 may have a second opening 295 to act as a vent when opening 294 is receiving the polymeric material into the enclosed space 278 for forming the frame 254.

Cap 274 may couple to body 272 in any manner known in the art. In the embodiment shown in FIG. 4, cap 274 has a length L3 and width W3 that is the same as length L2 and width W2 of body 272 such that cap 274 may insert into a top portion of body 272 to sealingly engage body 272 and seal membrane stack 252 within body 272.

As length L2 and width W2 of body 272 are greater than length L1 and width W1 of membrane stack 252, when membrane stack 252 is placed in body 272 and cap 274 is placed on top of body 272, inner end surfaces 280 and 282 and inner side surfaces 284 and 286 of body 272, bottom surface 288 of body 272, and inner surface 290 of cap 274 co-operate with membrane stack 252 to provide an enclosed space 278 surrounding the side surfaces 256, 258 and the end surfaces 260, 262 of the membrane stack 252. The skilled person will understand that the inner walls 280, 282, 284, 286 of body 272, bottom surface 288 of body 272, and inner surface 290 of cap 274 may have any size or shape to provide a frame having any size or shape surrounding the side walls and/or end walls of membrane stack 252. The height of the enclosed space 278 is generally equal to a height H of the membrane sack.

In some embodiments, membrane stack 252 can be coupled to bottom surface 288 prior to placing cap 274 on body 272 to retain membrane stack therein. For instance, membrane stack 252 can be coupled to bottom surface 288 prior to placing cap 274 on body 272 by applying weight on the top mold. In this manner, the membrane stack may be coupled with the bottom surface of the bottom mold and the polymer may not affect the surface of the membrane stack on the bottom side.

In other embodiments, bottom surface 288 may include retention ridges such as retention ridges 297 approximately sized to fit the membrane stack 252 to retain the membrane stack 252 in a central position on bottom surface 288 when the space 278 is filled with the polymeric material. In still other embodiments, membrane stack 252 can be held in place by cap 274 contacting and directing a downward force upon membrane stack 252 when cap 274 is positioned on top of body 272.

Figure 5:
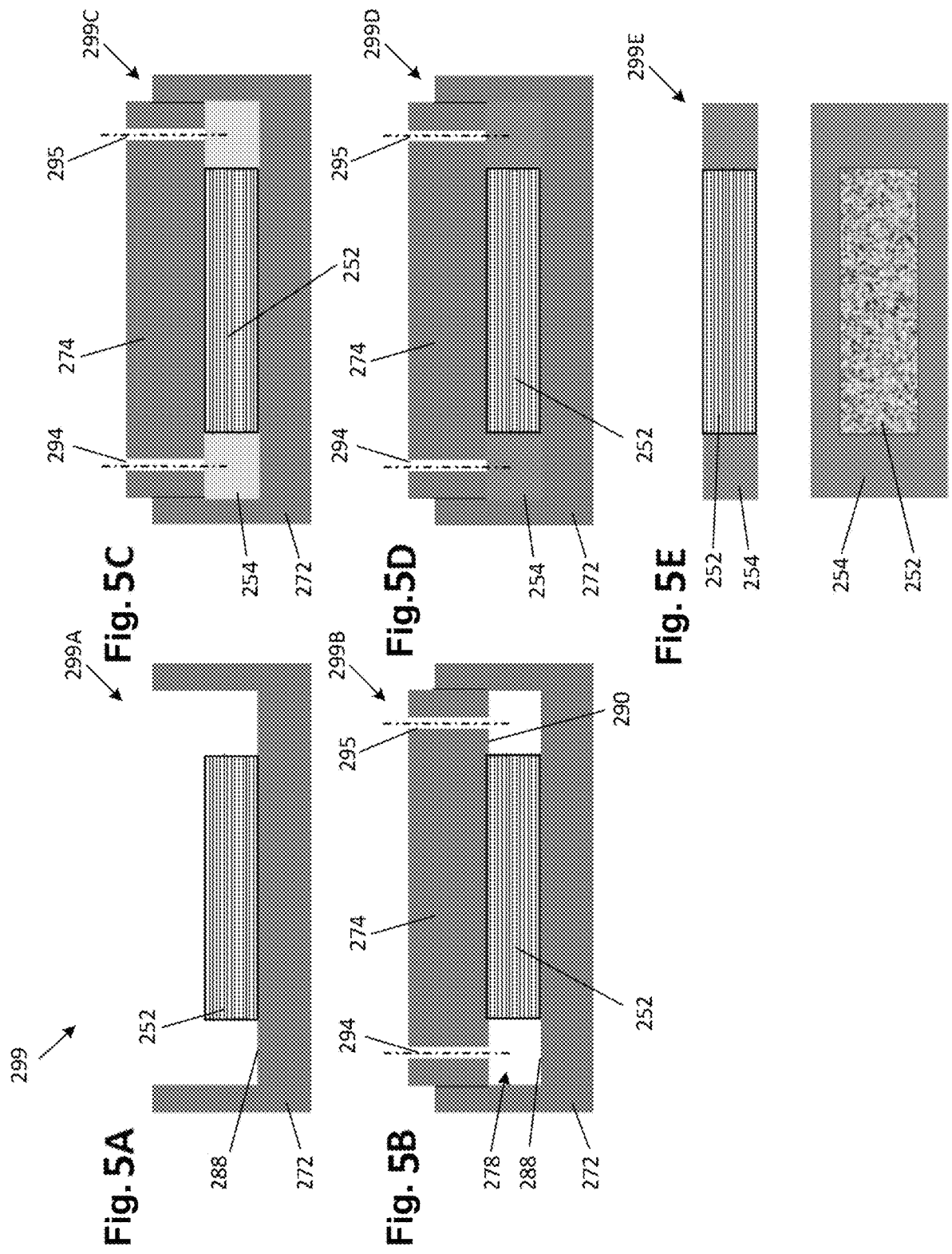
FIGS. 5A to 5E are schematic diagrams showing steps of a method of forming a frame around a membrane stack for a laterally-fed membrane chromatography device, according to one embodiment.

FIG. 5 shows a method 500 of forming a membrane stack of flat sheet membranes.

Method 299 includes a first step 299A of placing membrane stack 252 on to bottom surface of master mold 270. As described above, membrane 252 may be coupled to bottom surface 288 using an adhesive, retention ridges 297, or held in place by a downward force of cap 274.

At step 299B, cap 274 is placed onto body 272 to form space 278. Cap 274 sealingly engages body 272 to seal membrane stack 252 within the body 272 and to form a space 278 for injecting a polymeric material in to space 278. In some embodiments, bottom surface 290 of cap 274 will rest against a top surface of a top membrane of membrane stack 252 when cap 274 sealingly engages body 272. In other embodiments, bottom surface 290 of cap 274 may be spaced from a top surface of a top membrane of membrane stack 252 when cap 274 sealingly engages body 272. In this manner, body 272 may have an abutment member 293 (see FIG. 4) that engages bottom surface 290 when cap 274 seals body 272 to support cap 274 above membrane stack 252.

At step 299C, the polymeric material is injected into the space 278 through an opening 294 of the cap 274. The polymeric material may flow via gravity through the opening 294 into the space 278 surrounding the membrane stack 252. The polymeric material does not substantially flow laterally into the membrane stack 252 when injected into the space 278.

At step 299D, the polymeric material cures to form frame 274 around membrane stack 252. In some embodiments, the polymeric material may be a thermoplastic polymer material and cure by cooling to a temperature below a curing temperature of the material. In other embodiments, other mechanisms may be used to cure the polymeric material. For instance, the polymeric material may comprise a photoinitiator and cure upon exposure to ultraviolet (UV) light. In one example, the polymeric material may be a polyurethane based polymer. In some embodiments the curing times can vary from tens of minutes to overnight (e.g. in a range of about 8 to 12 hours).

At step 299E, the cap 274 and the body 272 of the master mold 270 are removed from the membrane stack 252 and frame 274. Upon removing the cap 274 and the body 272 the membrane stack 252 and frame 274 can be incorporated into a membrane chromatography device such as the laterally fed membrane chromatography device 100.

Figure 10:
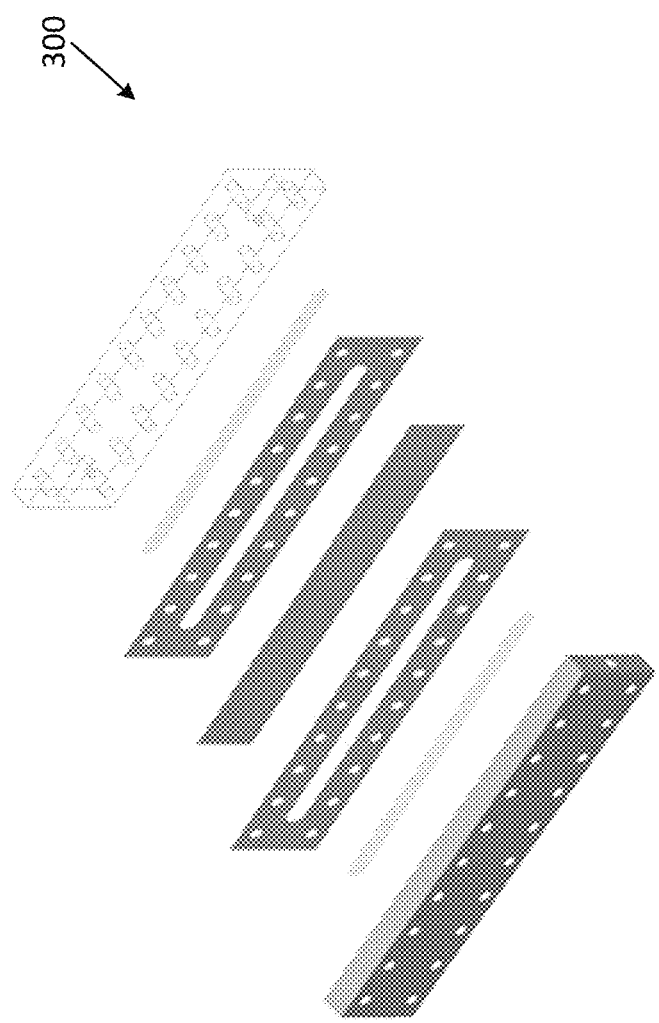
FIG. 10 is a schematic diagram showing an exploded perspective view of a fourth embodiment of a laterally-fed membrane chromatography device.

The above method 299 may be used to fabricate a module 270 such as but not limited to the middle plate 104 of the laterally-fed membrane chromatography (LFMC) device using polyurethane as the framing polymer material. Silicon rubber was used to make the master mold, i.e. both the top and bottom parts. The silicon hardener was mixed with the base in a 1:10 ratio to fill the blank which was designed using Autodesk Inventor. Membrane stacks of different thicknesses were prepared using this approach (an example is shown in FIG. 10).

As described above, a fluid is laterally distributed over the top surface (e.g. feed-side) of the membrane stack 109 and thereby enters (e.g. passes through) the membrane stack 109 at different locations along its length, eventually emerging at corresponding locations of the bottom surface (e.g. on the permeate side), where the fluid flows laterally to the outlet 123 of the device 100. This configuration makes it possible to balance the pressure-drop on the feed side with that on the permeate side, thereby ensuring uniformity of flow along the length of the membrane stack 109. Also, unlike a radial-flow device, where the superficial velocity within the bed increases in a radially inward direction, the flow of fluid through device 100 can be more uniform (e.g. fluid passing through a greater proportion of the membrane stack 109 when compared to radial-flow prior art devices). As shown in FIG. 2, the fluid has a flow path length that is independent of where the fluid enters the membrane stack 109. Therefore, the device 100 can provide for fluid passing therethrough to have a consistent path length through the device 100. This may improve the efficiency of membrane utilization and the resolution of eluted peaks in chromatographic separation.

In one example, top channel 108 extends from inlet 103 in a direction lateral to middle plate 104 (and therefore also membrane stack 109) and bottom channel 118 extends towards outlet 123 in a direction lateral to middle plate 104 (and therefore also membrane stack 109). Put another way, channels 108 and 118 can extend towards membrane stack 109 to provide that inlet 103 and outlet 123, respectively, are offset from membrane stack 109.

Figure 6:
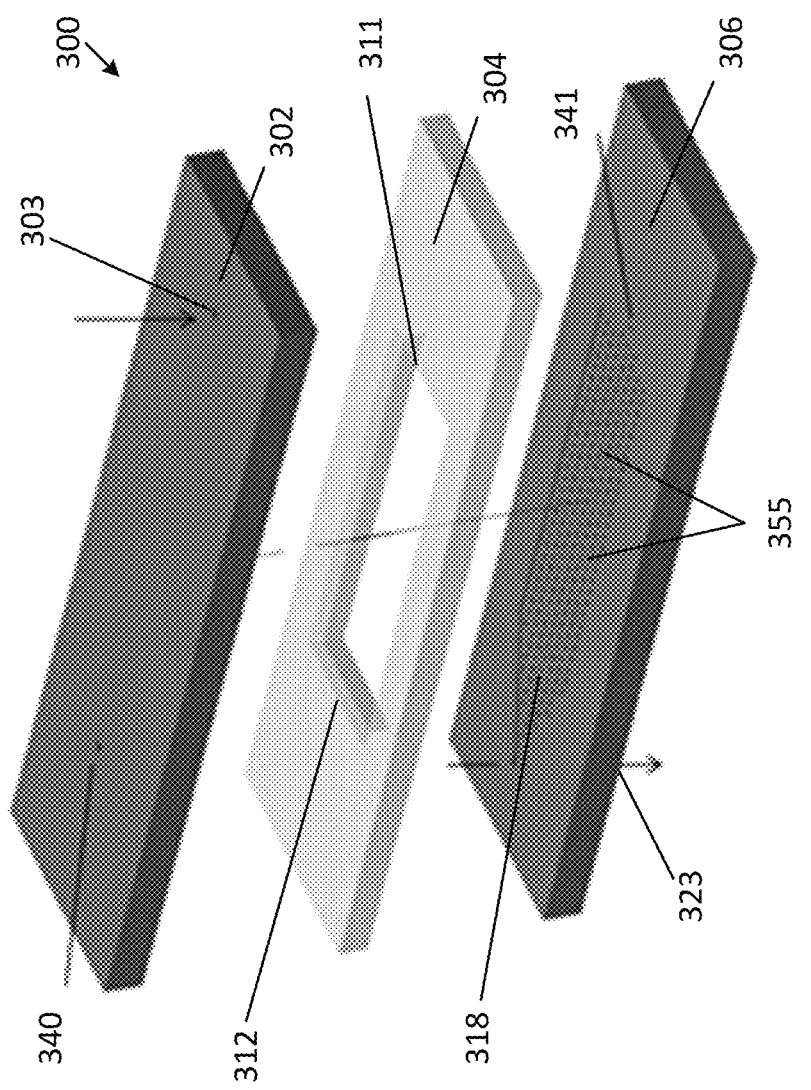
FIG. 6 is a schematic diagram showing an exploded perspective view of a second embodiment of a laterally-fed membrane chromatography device.
Figure 7:
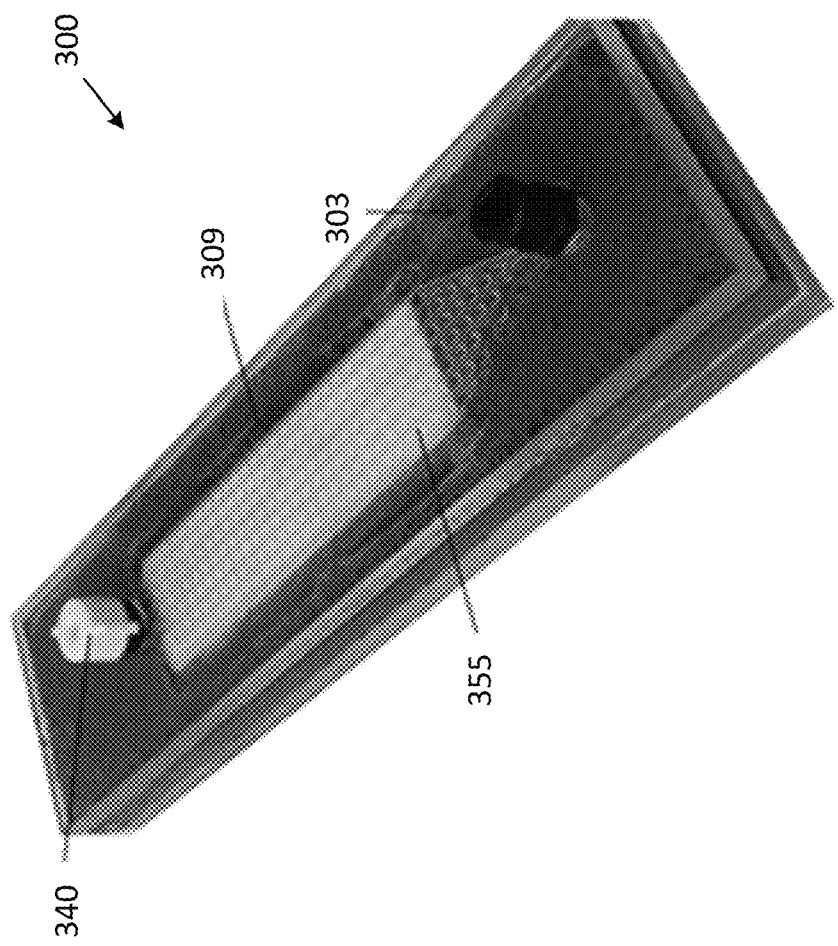
FIG. 7 is a perspective view of the laterally-fed membrane chromatography device of FIG. 3.

In one example, top channel 108 and bottom channel 118 can have an irregular shape (see FIGS. 6 and 7). In one example, as top channel 108 extends laterally from inlet 103 to leading edge 111, a width of top channel 108 can increase over the length of top channel 108. For example, a width of the top channel 108 can increase at a constant rate over its length (e.g. taper) or at a variable rate over its length (e.g. rounded). An irregular (e.g. tapered or rounded) shape of top channel 108 may provide for distribution of the fluid over the leading edge 111 of membrane stack 109 as fluid is provided by channel 108 from inlet 103 to membrane stack 109.

Similarly, in one example, as bottom channel 118 extends laterally from trailing edge 112 to outlet 123, a width of bottom channel 118 can decrease over the length of bottom channel 118. For example, a width of the bottom channel 118 can decrease at a constant rate over its length (e.g. taper) or at a variable rate over its length (e.g. rounded). An irregular (e.g. tapered or rounded) shape of bottom channel 118 may provide for collection of the fluid from trailing edge 112 of membrane stack 109 as fluid is provided by channel 118 from membrane stack 109 to outlet 123.

In some examples, top channel 108 and bottom channel 118 can each, independently, have a structure therein to disrupt the flow of fluid there through. For example, top channel 108 and bottom channel 118 can comprise a mesh layer (e.g. a structure having a pattern to disrupt flow within the channels 108,118). In some examples, the mesh layer 122 (not shown) within top channel 108 and bottom channel 118 can have a same thickness as top channel 108 and bottom channel 118. In another example (see FIG. 6, below) a plurality of pillars (e.g. microcolumns) can be provided within top channel 108 and bottom channel 118 to disrupt the flow of fluid there through. Structures (e.g. spacers) as described herein positioned in channels 108,118 can be used to provide each of channels 108,118 with similar lateral resistance over the sides (e.g. top surface and bottom surface of membrane stack 109 and/or leading edge 111 and training edge 112) of the membrane stack 109. The structures can also provide support for membrane stack 109 and may reduce dead volume within device 100. In one example, before assembling the device 100, channels 108 and 118 may be provided with 70 mm×20 mm pieces of woven wire mesh (approximately 0.5 mm thick)

Middle plate 104 as shown in FIG. 1 also defines a plurality of apertures 121 extending therethrough for securing middle plate 104 to top plate 102 and bottom plate 106. As described above, top plate 102 can be secured to middle plate 104 and bottom plate 106 in any appropriate manner (e.g. screws, bolts, pins, adhesives, etc.). In the embodiment shown in FIG. 1, the middle plate 104 is glued to the top plate 102 and bottom plate 106, however middle plate 104 can be coupled to the top plate 102 and the bottom plate 106 in any appropriate manner.

The direction of flow through membrane stack 109 is analogous to the fluid flow pathway shown in FIG. 2, where FIG. 2 shows a schematic view of a laterally-fed membrane chromatography device where inlet 203 and outlet 223 of device 200 direct fluid to and from membrane stack 209, respectively, in a direction that is parallel to the direction of flow of fluid through membrane stack 209. In contrast, inlet 103 and outlet 123 of device 100 direct fluid to and from membrane stack 109, respectively, in a direction that is transverse to the direction of flow of fluid through membrane stack 109. However, the direction of flow of fluid along top surface 225 and bottom surface 227 of membrane stack 209 as shown in FIG. 2 is analogous to the flow of fluid along the top surface and the bottom surface 127 (e.g. and collecting surface 130) of the device 100 of FIG. 1.

The fluid passing though membrane stack 109 can emerges from a bottom surface of a bottom membrane of the membrane stack 109 onto a collecting surface 130 of bottom plate 106. Collecting surface 130 can be formed into bottom plate 106 as shown in FIG. 1. Collecting surface 130 may be configured to direct fluid in a direction transverse to a direction of flow through the membrane stack 109 to bottom channel 118 for delivering the fluid to outlet 123 of device 100. The direction of flow of the fluid through channel 123 is transverse to the direction of flow of fluid through the membrane stack 109 and can be the same direction as the direction of fluid through channel 108. Device 105 also has a second end 107 opposed to first end 105.

Bottom plate 106 as shown in FIG. 1 also defines a plurality of apertures 122 extending therethrough for securing bottom plate 106 to middle plate 104 and top plate 102. As described above, top plate 102 can be secured to middle plate 104 and bottom plate 106 in any appropriate manner (e.g. screws, bolts, pins, adhesives, etc.).

In one example, top plate 102, middle plate 104 and bottom plate 106 can be acrylic plates 3D printed using a commercially available 3D printer (e.g. ProJet HD3000 printer by 3D Systems (Rock Hill, S.C., USA)). Top plate 102, middle plate 104 and bottom plate 106 can also be formed by polymer molding.

Plate 102 and 106 are generally made of polymer-based materials. In one example, each of the top plate 102 and the bottom plate 106 can be 3D-printed with acrylic-based polymers.

As can be seen in FIG. 2, the flow path lengths independent of the path travelled by the fluid through the membrane are generally the same. This may improve efficiency of membrane utilization (e.g. solute removal from the fluid) and thereby provide higher breakthrough binding capacity for the device.

FIG. 6 shows another embodiment of a laterally-fed membrane chromatography device 300. In this embodiment, top plate 302 and bottom plate 306 define top channel 308 (not shown) and bottom channel 318 for carrying fluid towards and away from, respectively, membrane stack 309 (not shown). In this embodiment, top channel 308 and bottom channel 318 are tapered channels (see 318) for distribution of the fluid over the leading edge 311 on the feed side and collection of the fluid of the fluid from the trailing edge 312 on the permeate side. For example, as shown in FIG. 6, bottom channel 318 is shown to reduce in width along its length as it direct fluid from the collecting surface In FIG. 6, pillars 355 are positioned in each of channels 308 and 318. The use of pillars 355 in channels 308 and 318 can provide for lowering lateral resistance within channels 308 and 318 and support membrane stack 309. In one embodiment, reducing the dimensions (e.g. length, width and depth) of channels 308 and 318 can reduce the dead volume of device 300.

As shown in FIG. 6, plates 302 and 306 are provided with vents 340 and 341, respectively. Vents 340 and 341 can be used to prime the device 300 and/or to remove of air bubbles trapped in the channels 308, 318, respectively.

FIG. 7 provides a picture of one example of a membrane chromatography device according to the embodiment described with respect to FIG. 6. In the example shown in FIG. 7, middle plate 304 was made of PVC.

Figure 8:
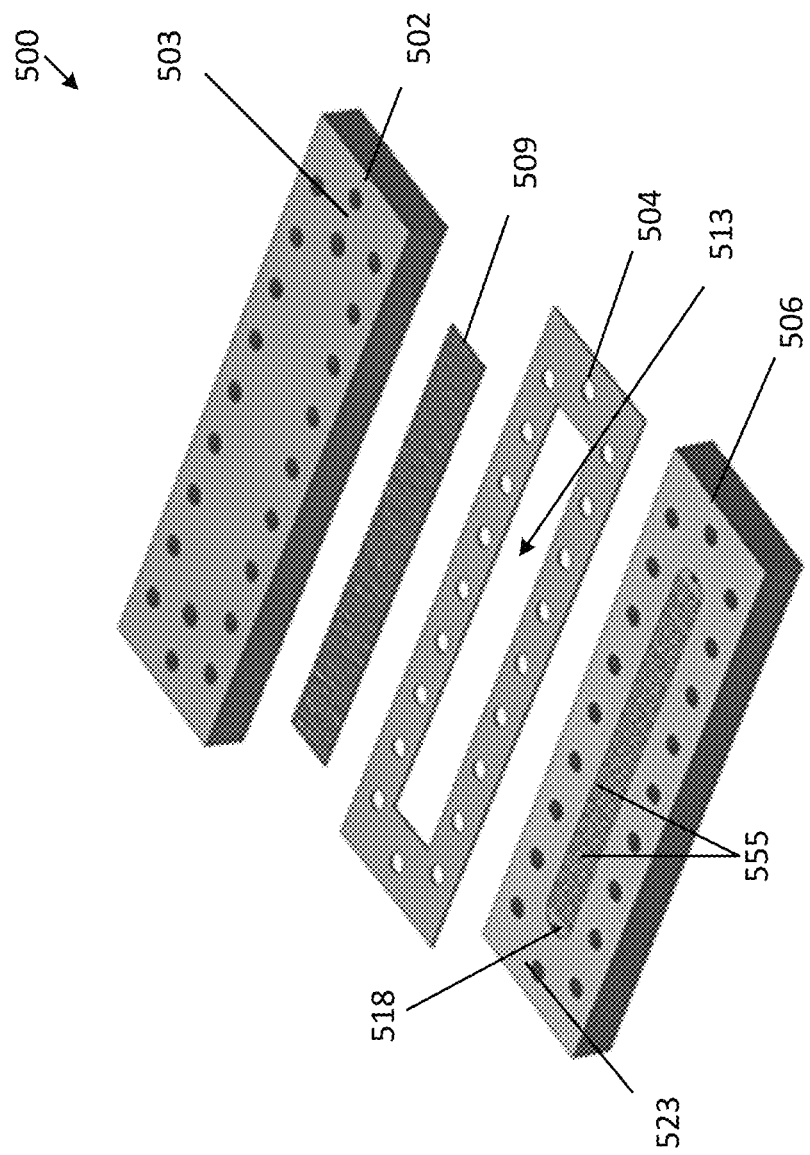
FIG. 8 is a schematic diagram showing an exploded perspective view of a third embodiment of a laterally-fed membrane chromatography device with rounded channels.

FIG. 8 shows an exploded view of another embodiment of a laterally-fed membrane chromatography device 500. In this embodiment, the membrane stack 509 is not coupled (e.g. glued) within the middle plate 504. Rather, the width and length of membrane stack 509 is shown to be similar to the width and length of the space 513 of middle plate 504. Also, the thickness of the membrane stack 509 is greater than the thickness of the middle plate 504 to provide that the device 509 is sealed when the plates 502, 504, 506 are sandwiched together.

Figure 9:
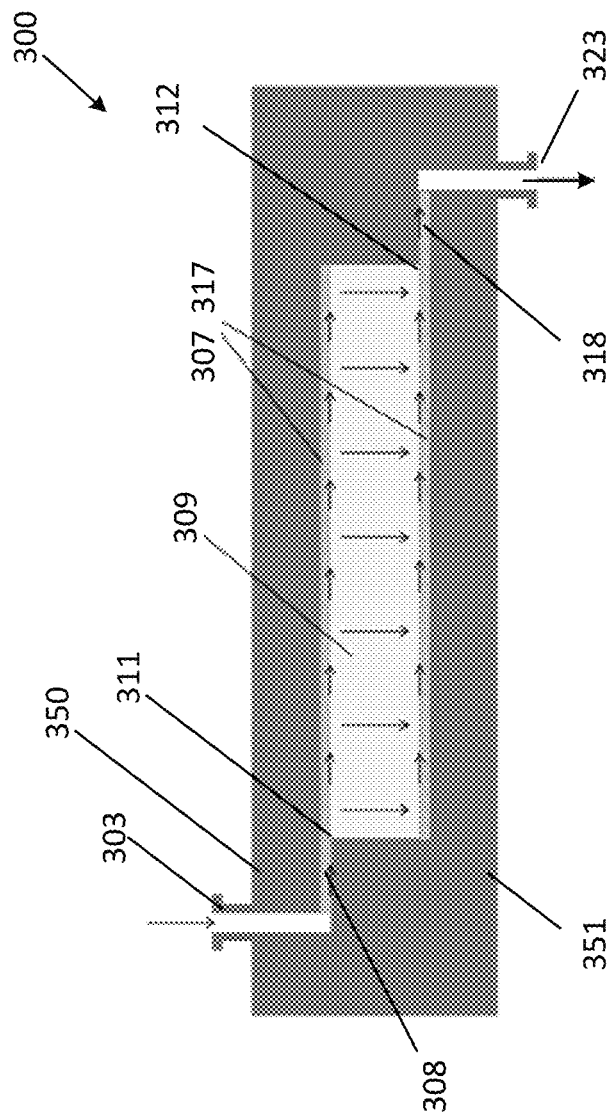
FIG. 9 is a schematic diagram showing a cross-sectional view of the laterally-fed membrane chromatography device of FIG. 6 illustrating flow of a fluid through the device.

FIG. 9 is a cross-sectional diagram showing an exemplar flow pathway through the membrane chromatography device of FIG. 6. In this embodiment, inlet 303 and outlet 323 are shown as directing fluid into the device 300 from a top surface 350 and out of the device 300 from a bottom surface 351, respectively. In this example, inlet 303 and outlet 323 are shown as directing fluid in a direction transverse to the direction of fluid through the first channel 308 and second channel 318, respectively (e.g. transverse to the direction of fluid flow along a top surface 307 and bottom surface 317 of membrane stack 309). In another example, inlet 303 and outlet 323 can direct fluid to flow in a direction perpendicular to the direction of flow of fluid through first channel 308 and second channel 318, respectively. Further, in the example shown in FIG. 9, inlet 303 and outlet 323 are positioned to be offset from the membrane stack 309. It should be noted that inlet 303 and outlet 323 can be positioned to be offset from the membrane stack 309 (e.g. by a length of top channel 308 or bottom channel 318, respectively) or be positioned aligned with leading edge 311 and trailing edge 312, respectively (e.g. a lateral distance between the inlet 303 and outlet 323 can match a length of membrane stack 209). Put another way, the inlet 303 being offset from the membrane stack 309 refers to the inlet 303 being laterally spaced from or distanced from leading edge 311 of the membrane stack 309 such that fluid entering the device 300 through the inlet 303 travels through the top channel 308 in a direction lateral to the direction of flow of the fluid through the membrane stack 309 to pass from the inlet 303 to the leading edge 311 (e.g. and the top surface 307) of the membrane stack 309. Likewise the outlet 323 being offset from the membrane stack 309 refers to the outlet 303 being laterally spaced from or distanced from the membrane stack 309 such that fluid exiting the device 300 through the outlet 323 travels through the bottom channel 318 in a direction lateral to the direction of flow of the fluid through the membrane stack 309 to travel from the trailing edge 312 (e.g. and the bottom surface 317) of the membrane stack 309 to the outlet 323. It should be noted that in one embodiment, top channel 308 and bottom channel 318 can have a same length to provide for equal pressure distribution across membrane stack 309.

In the embodiment shown in FIG. 9, the inlet 303 extends form top surface 350 of device 300 to top channel 308 to receive fluid into the device 100 and direct the fluid to top channel 308. Outlet 323 extends from bottom channel 318 to collect fluid from bottom channel 318 and direct the fluid out of the device 300.

In one example, the membrane chromatography devices described herein can be stacked to provide multiplexed systems for complex separations of multiple solutes from the fluid.

EXAMPLES

A device according to the embodiment shown in FIG. 6 was used to retrieve the first set of example results provided below. The device was fabricated with two different bed heights which gave the membrane bed volumes of 1 mL, 4.6 mL, and 9.2 mL as opposed to the 7 mL for the initial device described in.

Finally, cation exchange S membranes were glued in the frame using epoxy glue and the three layers were assembled using Weldon#16 adhesive. The final 9.2 mL device is shown in FIG. 7. Luer fittings were used to connect the inlet and outlet to the AKTA prime (GE health-care biosciences). Two other terminals were used for removing the bubbles which were blocked during the device operation.

The details of the device design, including the dimensions, membrane bed height, and bed volumes for the so far developed LFMC devices are available in Table 1.

TABLE 1

Design details of the LFMC devices

| Membrane bed volume (mL) | Bed height (mm) | Number of membrane layers | Membrane dimensions (mm × mm) | Pillar array | Outer dimension of plate (mm × mm) |
|---|---|---|---|---|---|
| 9.2 | 6.6 | 24 | 70 × 20 | 28 × 7 | 150 × 40 |
| 4.6 | 3.3 | 12 | 70 × 20 | 28 × 7 | 150 × 40 |
| 1.0 | 2.7 | 10 | 38 × 10 | 15 × 3 | 120 × 30 |

Analytical Hydrophobic Interaction Membrane Chromatography (HIMC)

The laterally fed membrane chromatography device as described above with reference to FIG. 7 was tested using a stack of rectangular hydrophilized poly(vinylidene fluoride) (PVDF) membranes. The top and bottom plates contained rectangular channels with dimensions of 100 mm×10 mm with curved ends. The height of the channel was 0.2 mm. The inlet and outlet port were both perpendicular to the plates. The channels contained hexagonal arrays of pillars for better flow distribution in the lateral direction. The membrane stacks were placed within the slot of a spacer with the thickness slightly lower than the membrane stack. The dimension of the sloth was 1.5 mm bigger than the rectangular curved channels from each side. The layers were sandwiched together using screws over the length of the device. The blowout diagram of the device is shown in FIG. 8.

Purification of PEGylated Proteins

PEGylation is one of the major post-translational modifications of therapeutic proteins in which polyethyleneglycol, a hydrophilic and inert polymer, is covalently attached to protein molecules. The increase in the hydrodynamic diameter of the molecule reduces the renal clearance rate; therefore, prolonging the circulation half-life of the protein drug and diminishing the number of needed drug administration. Moreover, PEG molecules shield the surface of the proteins which results in decreased proteolysis and aggregation as well as higher solubility. Protein PEGylation is usually carried out in a liquid batch reaction. The reaction products include mono-PEGylated proteins, di-PEGylated proteins, and higher PEGylated forms as well as the unreacted protein and PEG molecules. However, only the mono-PEGylated protein is the desired product and therefore it needs to be purified from other moieties available in the reaction mixture. The approaches for the separation of PEGylated proteins have been majorly based on charge, size, and hydrophobicity difference of the unreacted reagents and different PEGylated proteins. However, the most famous technique for purification of mono-PEGylated protein is the ion-exchange separation majorly using cation-exchange media. The fractionation is based on the interaction of PEGylated proteins with the cation-exchange media which goes weaker as the extent of PEGylation is increased. This is significantly owing to the shielding of the surface charges of the protein molecule by the neutral PEGs. Therefore, when the salt gradient is used for elution, the higher PEGylated proteins elute faster, followed by the mono-PEGylated form and the native proteins. It is noteworthy that the differences between the adsorption binding strength for different PEGylated proteins are very subtle which makes the separation very challenging.

Figure 11:
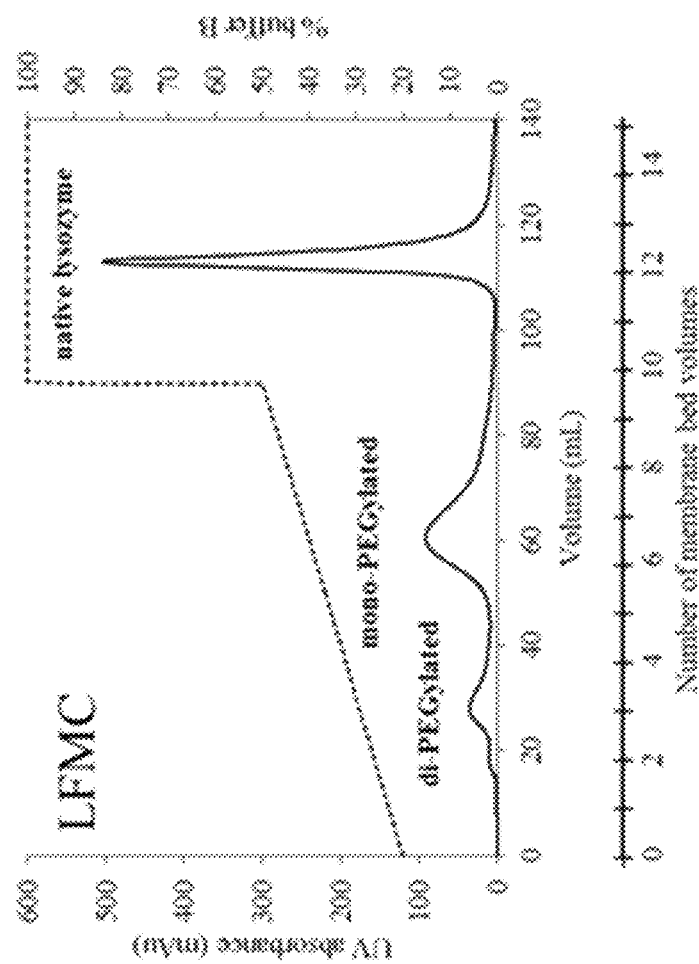
FIG. 11 is a graph showing a rate of purification of mono-PEGylated lysozyme using the laterally-fed membrane chromatography device of FIG. 6.

Purification of PEGylated lysozyme was performed using the 9.24 mL laterally-fed cation-exchange membrane chromatography device. PEGylation reactions were carried out using 5 kDa PEG and lysozyme as the model protein following the aldehyde chemistry. The reaction was carried out in 15 mL vials for 4 hours and then desalted by 3 kDa MWCO centrifugal ultra-filters. The retentate was diluted to acquire a certain total protein concentration which was then injected to the LFMC device. The injection was followed by a gradient to the eluting buffer containing 0.5 M sodium chloride. Subsequently, the gradient was optimized so that to give high-resolution of separation within the shortest volume. The results from the 4-hour reactions with 2 mg/mL total protein concentration are shown in FIG. 11.

Figure 12:
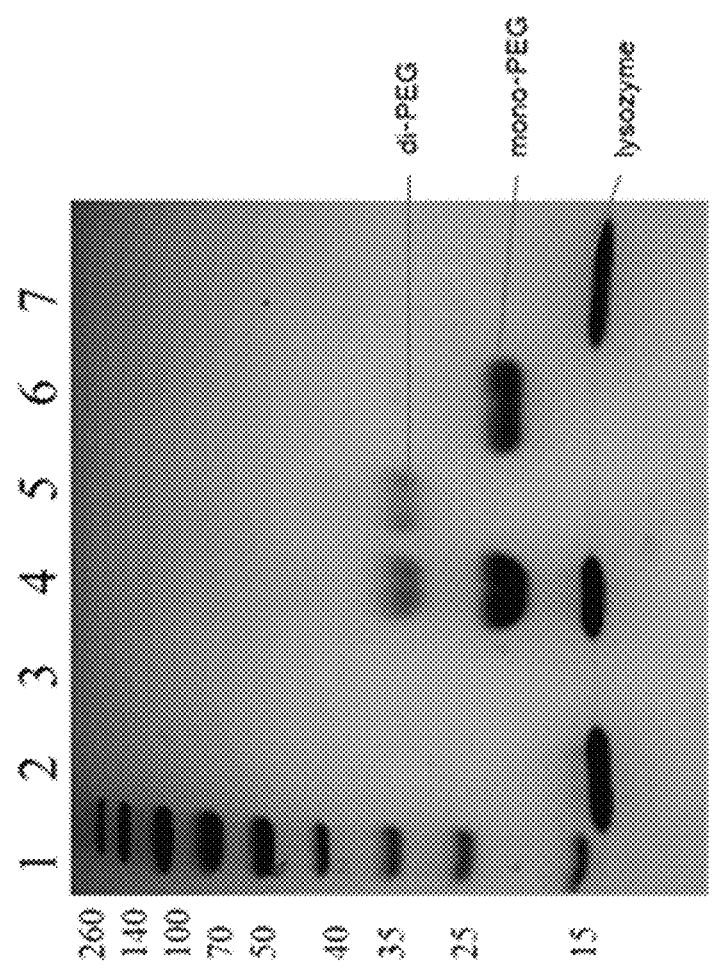
FIG. 12 is a picture showing SDS-PAGE results for a 4-hour reaction and 2 mg/mL total protein samples using the laterally-fed membrane chromatography device of FIG. 6.
Figure 13:
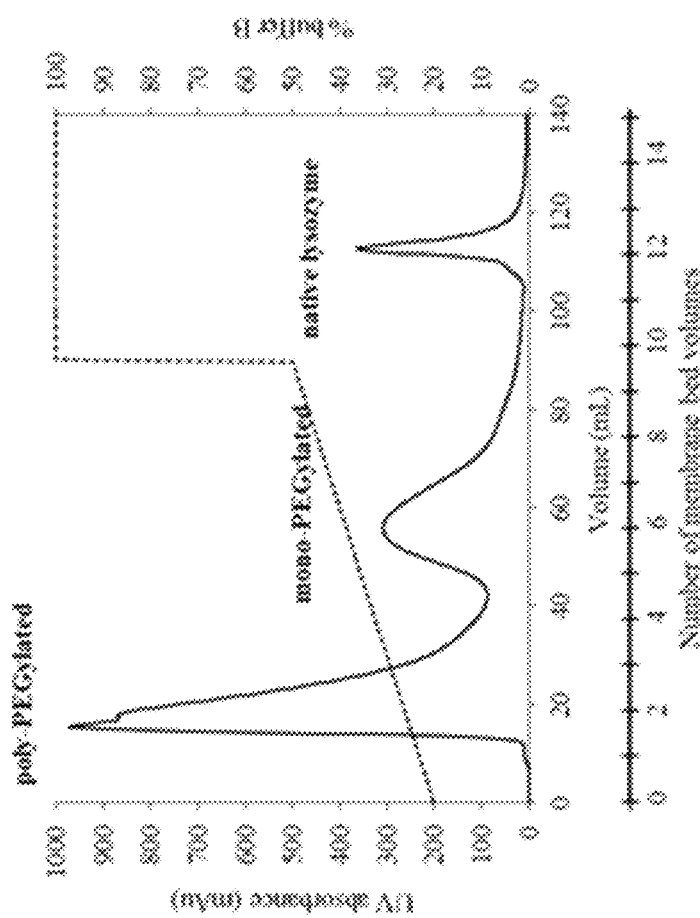
FIG. 13 is another graph showing purification of mono-PEGylated lysozyme using the laterally-fed membrane chromatography device of FIG. 6.
Figure 14:
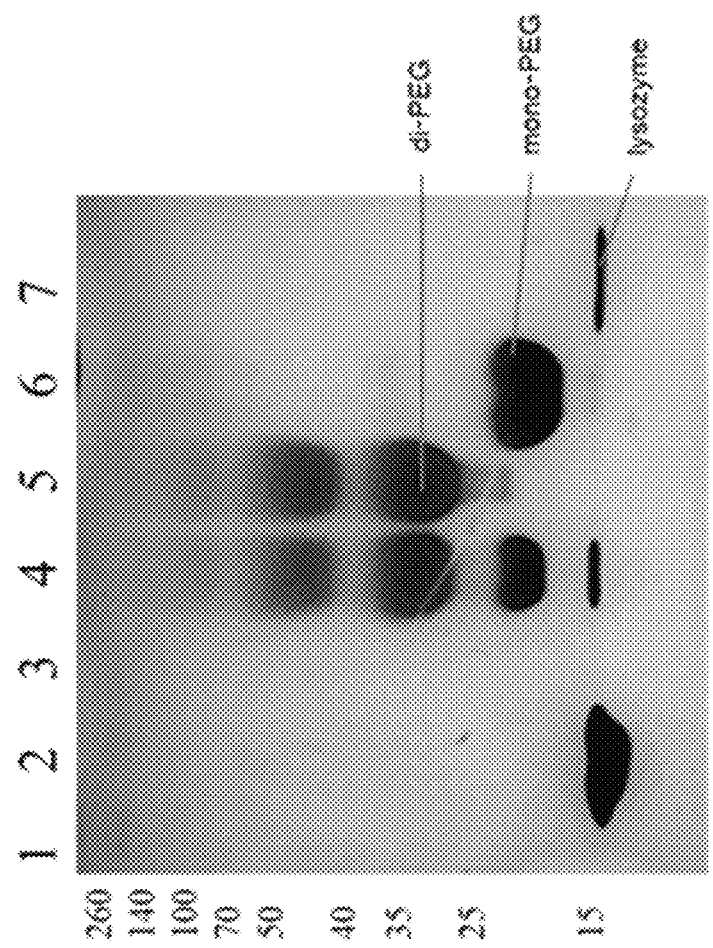
FIG. 14 is a picture showing SDS-PAGE results for 10-hour reaction and 10 mg/mL total protein samples using the laterally-fed membrane chromatography device of FIG. 6.

The optimized elution conditions was achieved when the sample was injected at 20% eluting buffer followed by a linear gradient to elute the di- and mono-PEGylated proteins, and a step-change elution to obtain the unreacted lysozyme. Different PEGylated proteins were fractionated within 10 membrane bed volumes (MBV=9.24 mL) and the peaks were collected and further analyzed by gel-electrophoresis. The results from the SDS-PAGE are shown in FIG. 12. Although separation was carried out at 15 mL/min (~1.5 MV/min) flow rate the resolution of separation is very high.

The results obtained from the separation of mono-PEGylated lysozyme were compared with the preparative techniques available in the literature using the packed-bed columns with the same sulphonated (S) strong cation exchange ligands. The reaction residence time as well as the PEG molecular size was consistent with the experimental conditions used for the LFMC device. GigaCap S-650 resins was used as the chromatography media having 13.4 mL bed volume and the separation was carried out at 1 mL/min. The results confirmed that the LFMC device gave comparable resolution of separation with the packed-bed columns. Plus, the separation was carried out with much greater speeds which is highly beneficial in large-scale manufacturing.

Separation of Monoclonal Antibody (mAb) Aggregates

Monoclonal antibodies (mAbs) are considered as the most prevalent therapeutic proteins in the biopharmaceutical industry. Manufactured by recombinant technology, mAbs have high tendency to self-associate into aggregates as a cause of high concentration as well as extreme shear rates and pH conditions in different stages of the manufacturing process. Antibody aggregation is highly unwanted as it usually leads to increased immunogenicity, loss of biological activity and decreased solubility of the therapeutic protein. Therefore, antibody oligomers should be separated from the final product. Separation during the downstream processing is the biggest opportunity to polish the antibody aggregates. Size-based analysis and separation of mAbs aggregates is very slow and often gives poor resolutions. This is while ion exchange chromatography has shown to be very useful in production scale polishing of aggregates. In the most recent strategies, cation exchange chromatography (CEX) is employed as the intermediate purification step in the downstream processing of mAbs which is taken place after the major protein capture step and is followed by anion-exchange polishing steps. CEX is carried out in the bind-and-elute mode in which impurities such as host cell proteins (HCPs), DNA, antibody fragments and soluble antibody aggregates are majorly separated from the target protein. More specifically, dextran-grafting cation exchangers have been widely exploited in process scale bioseparation. In the pH conditions that are not the pI of protein, protein aggregates bind more strongly to the cation exchangers.

Hydrophobic interaction membrane chromatography (HIMC) has been investigated for analysis and separation of protein aggregates. In comparison with CEX columns, the application of adsorptive membranes is cost-effective and the technique brings about rapid processing due to the convective solute transport. This is while samples have to be prepared in high concentration of anti-chaotropic salt conditions.

We investigated the performance of the LFMC device in the preparative scale (4.62 mL cation exchange membrane) for separation of antibody aggregates. Initially, purification of heavy chain monoclonal antibody EG2-hFc was taken into consideration. EG2-hFc is a camelid chimeric heavy chain mAb, genetically engineered to have human Fc region. Therefore, protein-A chromatography was used as a capture step for samples from the day 7 of cell culture. However, protein-A columns are not capable of removing any mAb aggregates due to the fact that Fc region does not get affected in the aggregation process.

Figure 15:
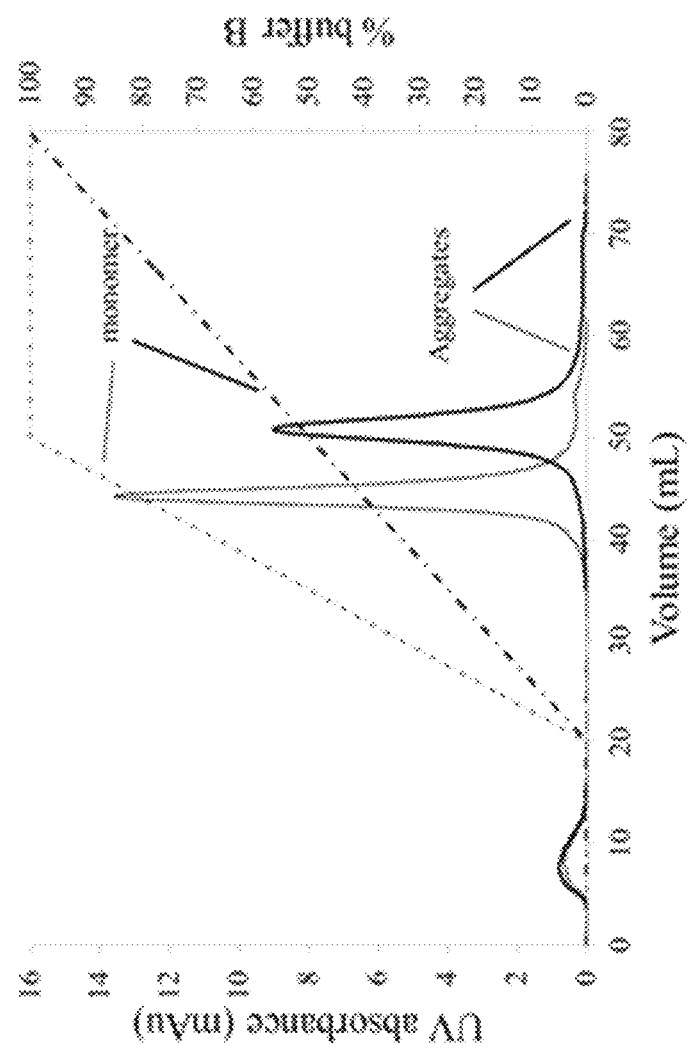
FIG. 15 is a graph showing separation of EG2-hFc using the laterally-fed membrane chromatography device of FIG. 6.

Preliminary experiments were run to find the optimized pH for the separation of EG2-hFc aggregates. The values of 5.0, 5.5, and 6.0 were studied and pH=6.0 gave the best results. Protein-A purified EG2-hFc samples having concentration of 0.05 mg/mL and volume of 5 mL were injected in the device. With the linear gradient elution of 30 mL to the eluting buffer which contained 0.5M sodium chloride, the EG2-hFc aggregates were resolved. Higher gradient (60 mL) was also examined for near baseline separation (FIG. 15). It is noteworthy that although the separations were run at 20 mL/min flow rates the resolution of separation was high enough to resolve the aggregates within only five membrane bed volumes. The LFMC device offers high resolution and high throughput separation of mAb aggregates with cation exchange mechanism.

Figure 16:
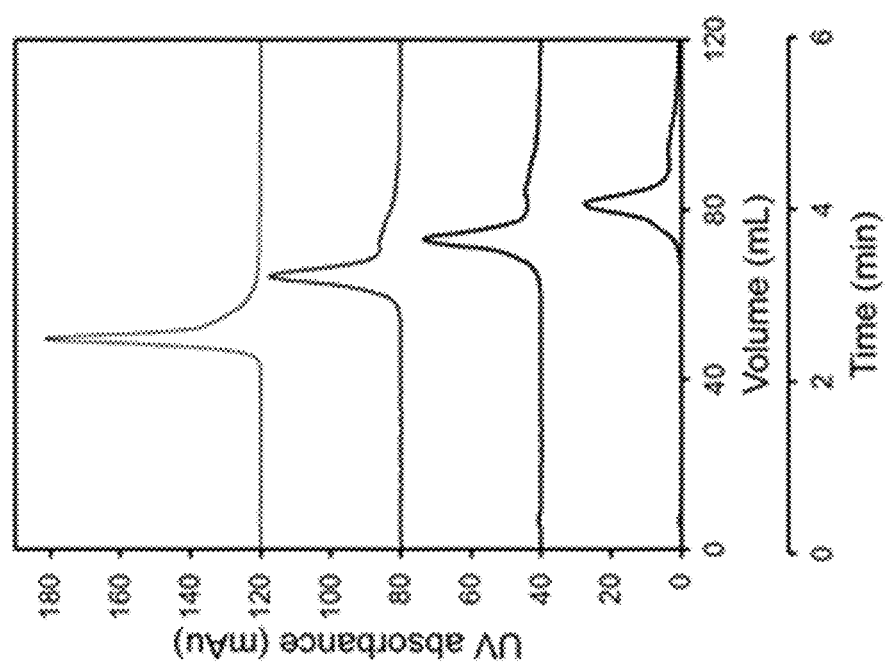
FIG. 16 is a graph showing aggregate removal of IgG1 from HEK cell line using the laterally-fed membrane chromatography device of FIG. 6.
Figure 17:
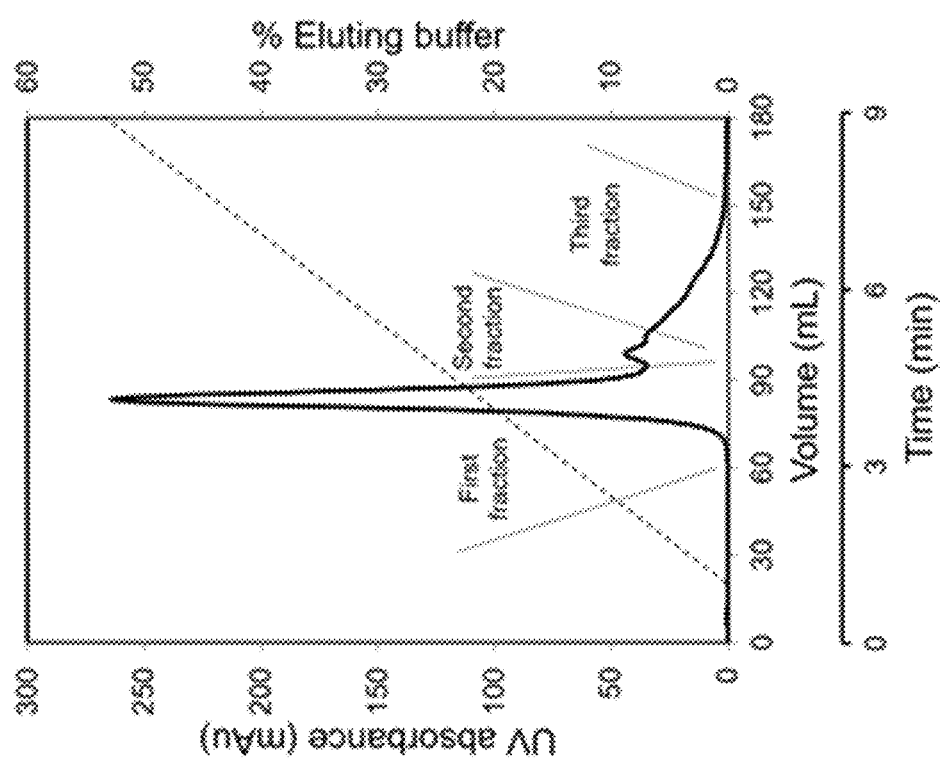
FIG. 17 is a graph showing aggregate removal of IgG1 from HEK cell line using the laterally-fed membrane chromatography device of FIG. 6.

The separation of IgG1 aggregates from the HEK 293 cell line kindly donated from Durocher lab at National Research Council of Canada, Montreal was also investigated. Samples having 0.5 mg/mL total protein and 2 mL volume were injected to the LFMC device. Other experimental conditions were kept the same with the EG2-hFc runs described above. Initially, different linear gradients to the eluting buffer within the range of 100 mL and 300 mL were examined (FIG. 16). The 300 mL gradient gave the best separation of aggregates which is shown in FIG. 17.

Figure 18:
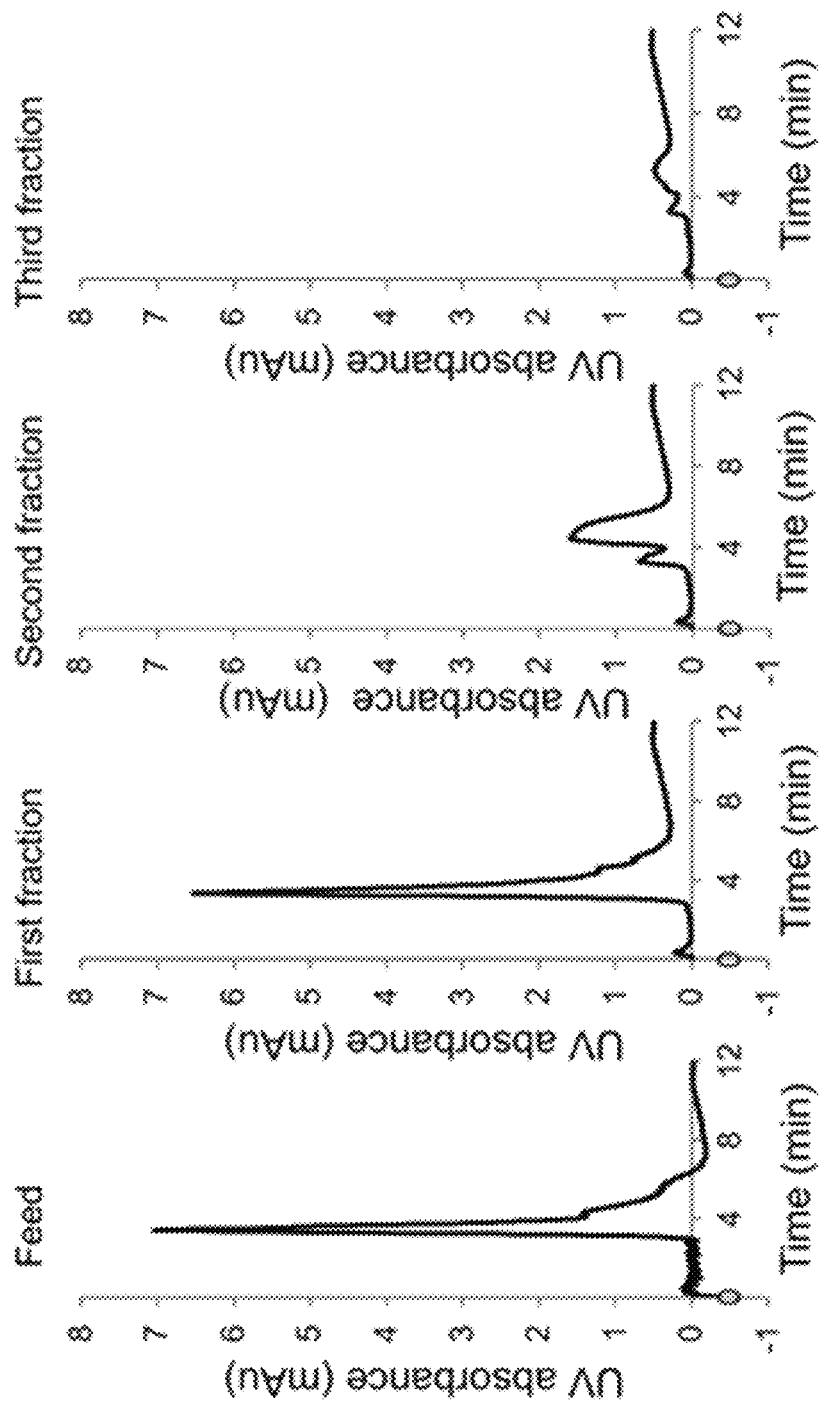
FIG. 18 is a graph showing HIMC analysis of the IgG1 aggregate separation peaks for separation conducted using the laterally-fed membrane chromatography device of FIG. 6.
Figure 19:
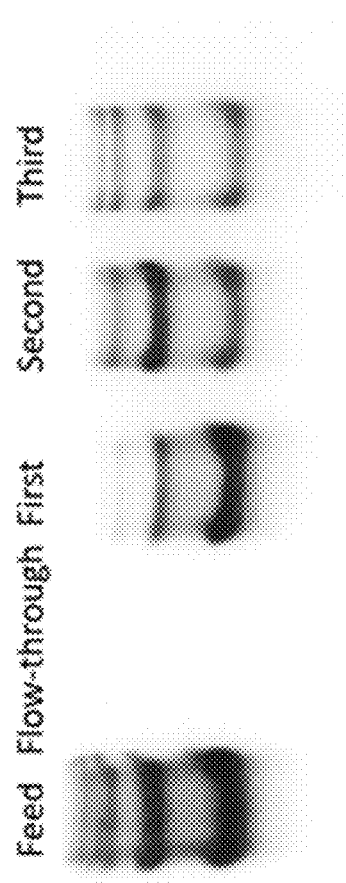
FIG. 19 is a picture showing Native PAGE analysis of the IgG1 aggregate separation peaks.

Higher sample concentrations and volumes were experimented to challenge the LFMC device. The flow through peak as well as the three eluting peaks was collected and analyzed using hydrophobic interaction membrane chromatography (HIMC) technique. The feed concentration was set to 0.2 mg/mL and the collected peaks were concentrated accordingly (FIG. 18). The peaks were also analyzed using 7.5% Native PAGE, the results of which are shown in FIG. 19. The results confirm the separation of the monomeric IgG1 from the aggregates when relatively high concentrations of the mAbs were processed. The LFMC device is capable of resolving the monomeric IgG1 mAbs from the aggregated forms within 20 membrane bed volumes. It is noteworthy that compared to the EG2-hFc experiments, the samples have high aggregate contents which makes the separation highly challenging.

The LFMC device offers high resolution purification of mAbs in the bind-and-elute mode with high throughputs. Considering the easy scale-up of the device, the LFMC device has great potentials to serve as the intermediate separation stage in the production of mAbs, helping with decreasing the processing time, buffer usage, and moving towards disposable chromatography units.

Ultra-Fast Analysis of Monoclonal Antibody (mAb) Aggregates

The current state of the art for rapid analysis of mAb aggregates is size exclusion chromatography based on the use of sub-2 micro resin particles by ultra-high pressure liquid chromatography (UPLC). Making use of such small resin particles diminished the flow path length and provides higher number of theoretical plates per unit length of the column. Therefore, the UPLC columns have shorter volumes and are run with typical flow rates due to which they provide much higher throughput compared to conventional HPLC systems. However, the fast assay time are at the sacrifice of the pressure. UPLC systems are operate at one order of magnitude higher pressures which requires costly pumps and sealing equipment.

Figure 20:
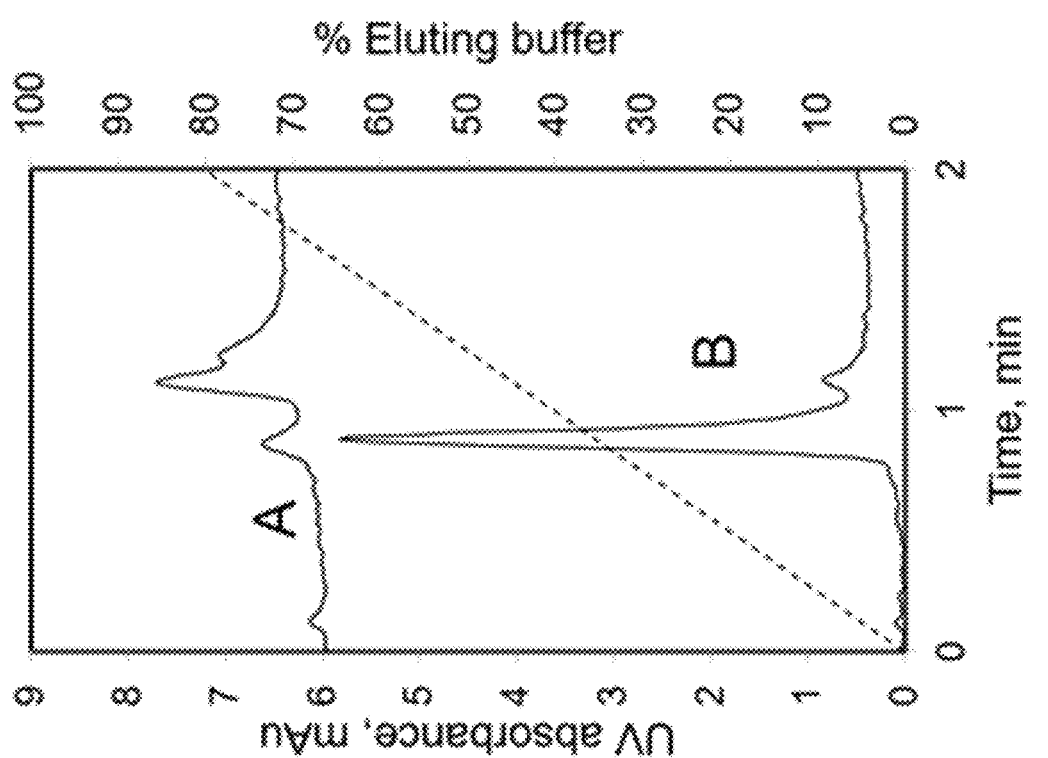
FIG. 20 is a graph showing HI-LFMC results obtained with campath-1H samples.

The analytical device described in FIG. 8 was used for ultra-fast separation of mAb aggregates. Three layers of PVDF membrane were housed within the device providing the bed volume of 0.4 mL. The separation was based on the higher binding strength of the aggregates compared to the native monomeric antibody. The experiments were carried out using linear negative salt gradients at 16 mL/min. As a result of high operating flow rate, the aggregate analysis was achieved in less than 1.5 min. FIG. 20 demonstrates the results obtained with Chinese hamster ovary (CHO) derived Alemtuzumab (campath-1H). Chromatogram A showing the aggregate analysis for an aggregate-rich sample whereas B was obtained with a monomer-rich sample. High-resolution monomer/aggregate separation was attained in very short assay time.

In comparison, due to low bed height of the membrane stack, the pressure drops were below 200 kPa. Comparing the hydrophobic interaction laterally-fed membrane chromatography (HI-LFMC) discussed with the UPLC techniques for mAb aggregate analysis, the HI-LFMC is extensively cheaper, the pressure drops are much lower, and the devices can be used in a single-use manner. The possibility of having such an ultra-fast assay which can be run with bench-top liquid chromatography machines such as AKTA systems is highly advantageous.

Figure 21:
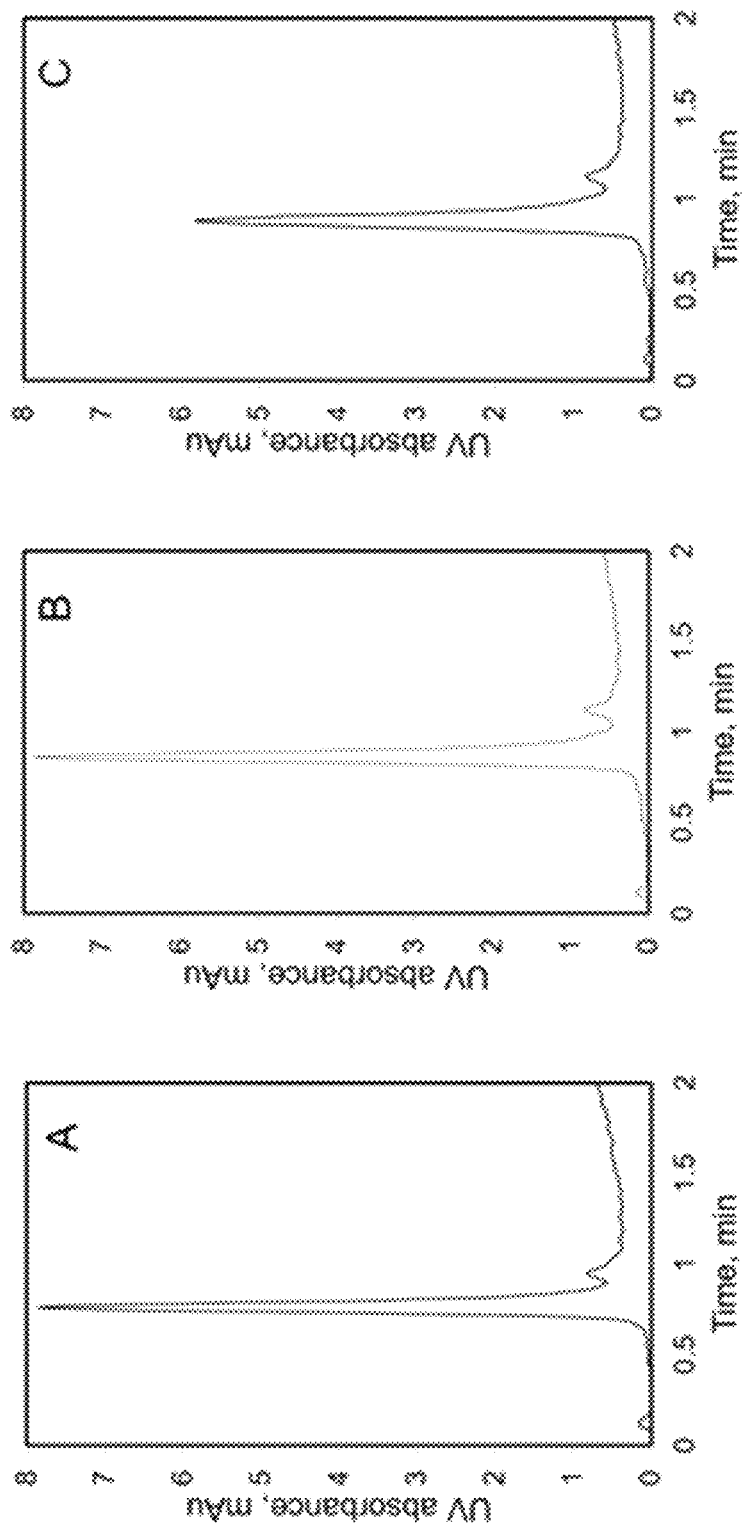
FIG. 21 is a graph showing effect of dead volume on aggregate analysis of monomer-rich campath-1H using the laterally-fed membrane chromatography device of FIG. 6.
Figure 22:
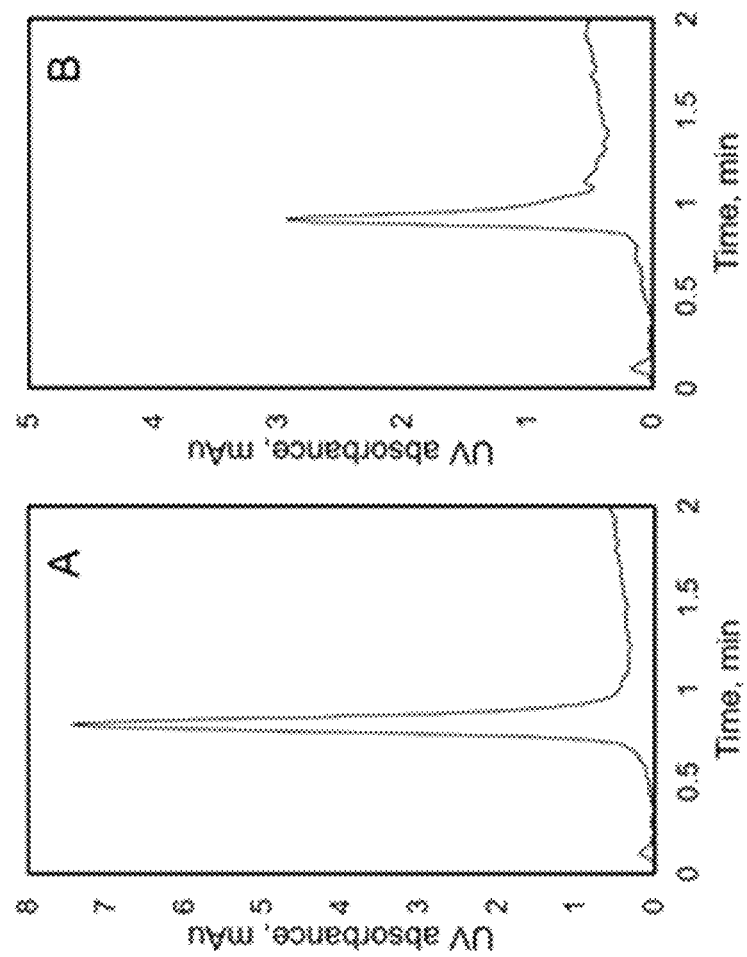
FIG. 22 is a graph showing HI-LFMC for using the laterally-fed membrane chromatography device of FIG. 8.

The dead volume of the analytical device was further decreased by increasing the pillar size in both the feed and the permeate channel. The device was tested with campath-1H monomer-rich sample shown in FIG. 21. While chromatogram C is the repeat for the results shown in FIG. 20, B, FIG. 21, B illustrates the chromatogram obtained with the device with lower dead volume. Evidently, the peaks obtained are much sharper. Therefore, the separation was also carried out with 30 mL linear gradient shown in FIG. 20, A which helped with decreasing the separation time even further. The validity of the technique was then approved for two other mAb samples, HIgG1-CD4 (campath-9) and human embryonic kidney 293 (HEK) cell derived IgG1 (Trastuzumab biosimilar).

Module Design: Comparison with Stacked-Disk Devices

The performance of a laterally-fed membrane device according to FIG. 10 was compared with that of an equivalent centrally-fed, disc-based membrane module using a single layer membrane. Anion-exchange membrane sheets having the same surface area and thickness, and thereby same bed volume were used in both devices. Tracer experiments were carried out using a dye as well as a protein (lysozyme) under non-binding condition. Bovine serum albumin (or BSA) was used as model binding protein to determine the binding capacities of membrane sheets of identical surface area and bed volume housed in the and stacked-disk modules were compared in the breakthrough and pulse modes. The results obtained are discussed.

The circular module had an outer diameter of 75 mm while the laterally fed module had an external dimension of 200 mm×40 mm. Membrane assemblies consisting of the adsorptive membrane sandwiched between two plastic shim layers as spacers (each of 0.3175 mm thickness) was held between the top and bottom plates. The circular or rectangular spaces within the Teflon spacers on both sides of a membrane were filled with woven wire meshes which served as membrane support and liquid distributor. Appropriately positioned screws were used to hold the top and bottom plates together. The effective membrane area in both of these devices was 12.57 cm$^2$. The effective diameter of membrane used in the circular module which corresponded to the area of the space within the Teflon spacer was 40 mm whereas the effective length and breadth of the rectangular membrane housed within the laterally-fed device was 157 mm×8 mm. The dimensions of the inlet and outlet were minimized as much as possible to reduce the dead volume of these devices. In addition to the inlet and outlet, the modules were provided with additional ports for priming and removal of bubbles prior to each run.

The dye tracer experiments were performed using ten times diluted food colour solutions. The dye was found to bind strongly to the Sartobind Q membrane and so hydrophilized PVDF membranes having 0.22 μm pore size was used in the dye experiments. Degassed microfiltered water was pumped at a flow rate of 10 mL/min from a reservoir to the membrane modules using a HiLoad P-50 pump (GE Healthcare, Piscataway, N.J., USA). A sample injector fitted with a 250 μL loop, installed between the pump and module was used to introduce the food dye into the devices. The transparent (acrylic) side of the membrane module was illuminated using a table lamp. A digital camera (Sony Cyber-shot, Model DSC-WX7, Japan) was used to take video clips of the membrane surface during the dye experiments. Video clips were recorded in MTS format and the extent of zooming together with the location of the camera relative to the module was kept the same in all the experiments. Snapshots were obtained from the video files at the rate of one every second using Windows Live Movie Maker and processed using Image J freeware (http://imagej.nih.gov/ij/). The gray scale intensities of the snapshots were measured by coding macros. For the circular membrane module, intensities of pixels on the radius from the center to the periphery (73 pixels in all) were recorded for all 30 frames and were multiplied by the area of the circular increment corresponding to the distance of the pixel from center. For the laterally-fed module, intensities of the pixels were measured along the length of the membrane (570 pixes in all) and were multiplied by the width of the membrane. To avoid any discrepancies owing to the experiment-to-experiment variations, the intensities were normalized by subtracting the base line intensity for each pixel, this being the intensity at time zero.

For the protein experiments, the modules fitted with Sartobind Q membrane were integrated with an AktaPrime liquid chromatography system (GE Healthcare Bioscience, QC, Canada) using PEEK tubings. Phosphate buffer (20 mM, pH 7.0) was used as the binding buffer as well as for preparing the feed protein solutions. The eluting buffer consisted to the binding buffer containing in addition, 0.5 M NaCl. All buffers were degassed and filtered using PVDF filters (VVLP04700, 0.1 μm pore size, Millipore, Billerica, Mass., USA) just before carrying out the membrane chromatography experiments which were carried out at 10 mL/min flow rate. In experiments where lysozyme was used as the unbound tracer, lysozyme solution was injected using a 250 μL sample loop. Breakthrough experiments were carried out by injecting BSA solutions of appropriate concentration prepared in the binding buffer. A 50 mL superloop was used to inject the protein solution into the modules. The BSA bound to the membrane was eluted using buffer containing 0.5 M sodium chloride. The void volume of the membrane modules was determined using lysozyme which did not bind to the Sartobind Q membrane and the breakthrough curves were corrected accordingly. BSA binding experiments were also carried out in the pulse mode by injecting 100 μL of BSA solution.

Figure 23:
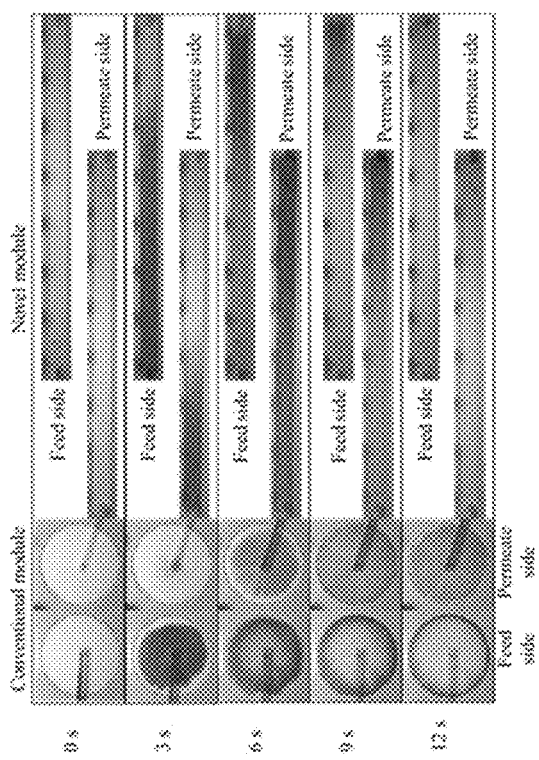
FIG. 23 is a collection of snapshots of feed and permeate sides of a stacked-disk and a laterally-fed membrane module obtained during dye tracer experiments at 0, 3, 6, 9, and 12 seconds.

FIG. 23 shows snapshots from the first twelve seconds of the dye experiments carried out with the stacked-disk and laterally-fed modules. The aim of these dye experiments was to visually compare the flow distribution on the feed side as well as the effluent collection on the permeate side of the membrane modules. As already stated, only the top acrylic plates of the modules were transparent. The inlet and outlet connections were therefore swapped around to make either the feed side or the permeate side transparent. This was feasible as top and bottom plates, though made of different material, were identical in design. The time zero in each case was designated to the instant at which the dye just entered the module. The snapshots of the stacked-disk module showed the dye breaking through the central region of the module after three seconds, with the peripheral region of the feed side of the membrane still free of dye. After six seconds, the central region on the feed side started getting depleted of dye while the dye breakthrough in the peripheral region was yet to happen. After twelve seconds, the feed side of the membrane was largely free of dye except for the periphery and the uniform coloration on the permeate side was due to the dye breaking through the peripheral region and migrating to the outlet located at the center of the module. Overall, the snapshots obtained with the stacked-disk module clearly indicate acute maldistribution of dye. Therefore the breakthrough binding capacity with this device would be expected to be low and flow-through and eluate peaks would be broad. The snapshots obtained with the device show very good correlation in dye intensity on the feed and permeate side with excellent lateral distribution. Therefore the fluid flow and distribution was as hypothesized, i.e. the variability in solute flow path length was low. Based on this, it could be anticipated that the efficiency of separation using the laterally-fed membrane module would be high.

Figure 24:
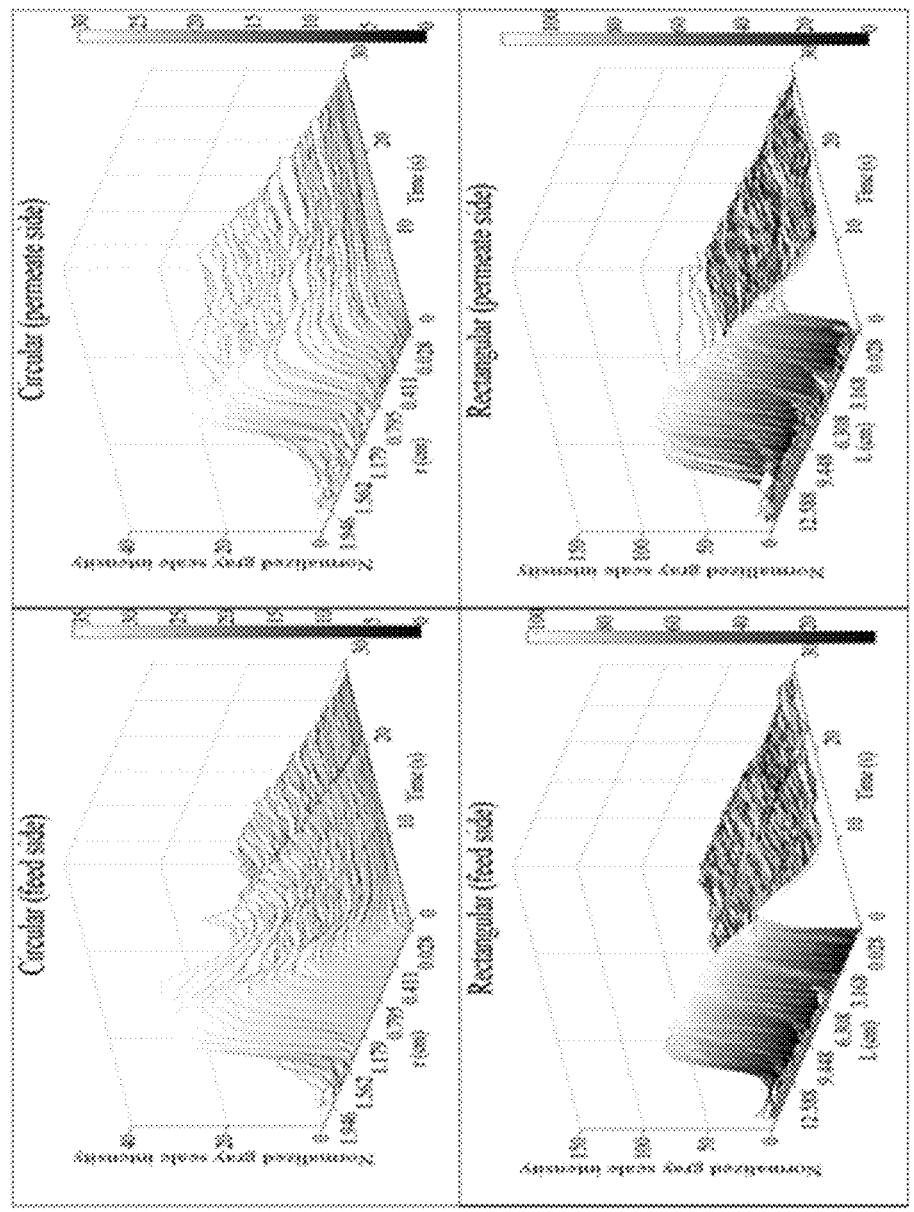
FIG. 24 is a representation of grayscale intensity data obtained from snapshots shown in FIG. 21 using Image J (membrane: hydrophilized PVDF; pore size: 0.22 micron; feed sample: 10 times diluted McCormick red food dye; volume injected: 250 µL; flow rate: 10 mL/min).

FIG. 24 represents the quantitative analysis of dye experiments. The 3D graphs show the variations of normalized gray scale intensity with time and location within the two membrane modules. The normalized gray scale intensity could be considered to be proportional to the amount of dye at a given location. With the stacked-disk membrane module, the peak heights increased from the center to the periphery as the membrane areas increased in a radially outward direction. The graphs also show that it took longer for the dye to reach the periphery and once this happened, the dye lingered in the peripheral regions of the membrane for a long time. On the other hand, the graphs for the laterally-fed membrane module showed a much more gradual shift of the peak which had a largely constant height, from the inlet to the outlet side, clearly indicating a far more uniform solute path length. These results once again predict higher efficiency of separation with the laterally-fed membrane module.

Figure 25:
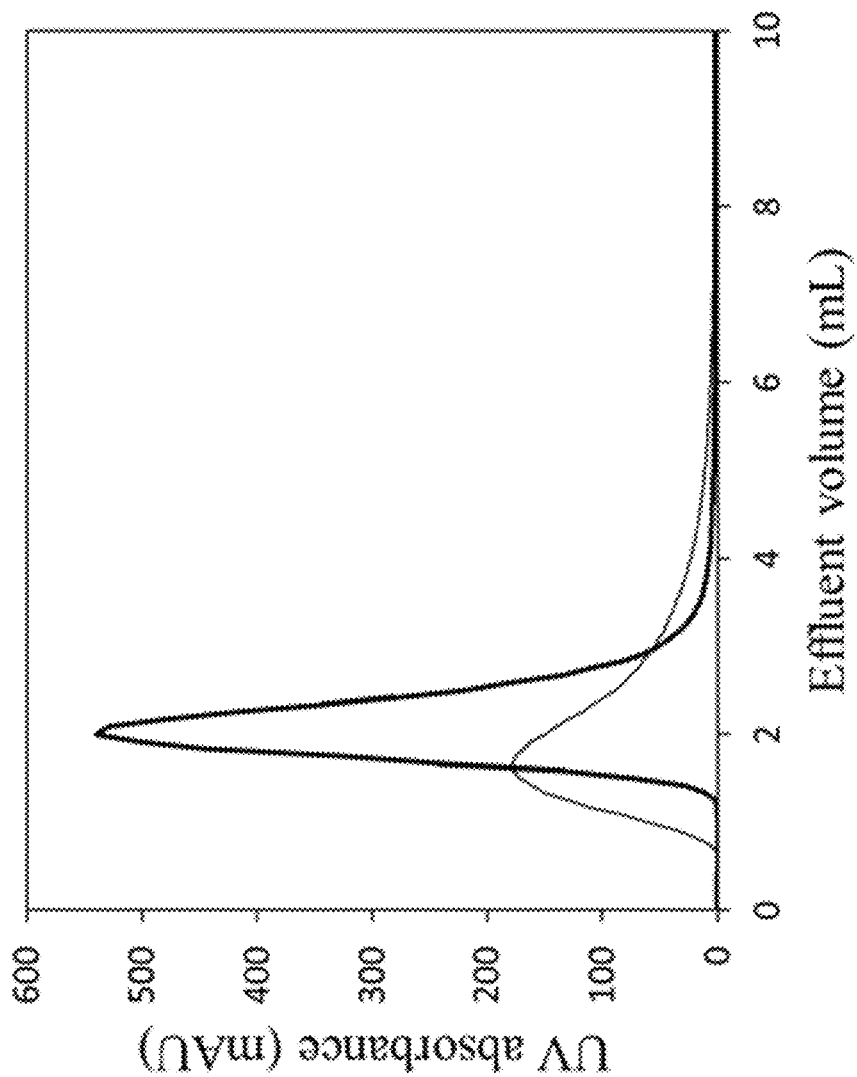
FIG. 25 is a graph showing flow though lysozyme peaks obtained at non-binding condition with stacked-disk (thin line) and laterally-fed (thick line) membrane modules.

Tracer experiments were carried out with Sartobind Q membrane using lysozyme as non-binding protein. FIG. 25 shows the flow-through peaks obtained with the two modules using 250 µL of 2 mg/mL lysozyme solutions under non-binding condition (i.e. at pH=7.0). The peak obtained with the laterally-fed membrane module was significantly sharper and more symmetrical. With the stacked-disk module, lysozyme appeared in the effluent earlier, even though the dead volume of the stacked-disk module was larger than that of the laterally-fed membrane module. This was consistent with the results of the dye experiments discussed earlier, where very early breakthrough at the central region of the membrane was observed. The broadening of the peak with the stacked-disk module, which is indicative of flow maldistribution, was consistent with the dye experiments where the dye lingered on in the peripheral regions for quite some time before reaching the outlet. The widths at half height and the standard deviations of the flow-through peaks obtained with the two modules are shown in Table 2. These values indicate that the flow distribution and thereby the uniformity of solute path length was significantly superior with the laterally-fed membrane module.

TABLE 2

Width of Flow-through peaks of a stacked disk device and a laterally fed device.

|  | Peak width at half height (mL) | Standard deviation |
|---|---|---|
| Stacked-disk | 1.386 | 0.588 |
| Laterally-fed | 0.74 | 0.314 |

Figure 26:
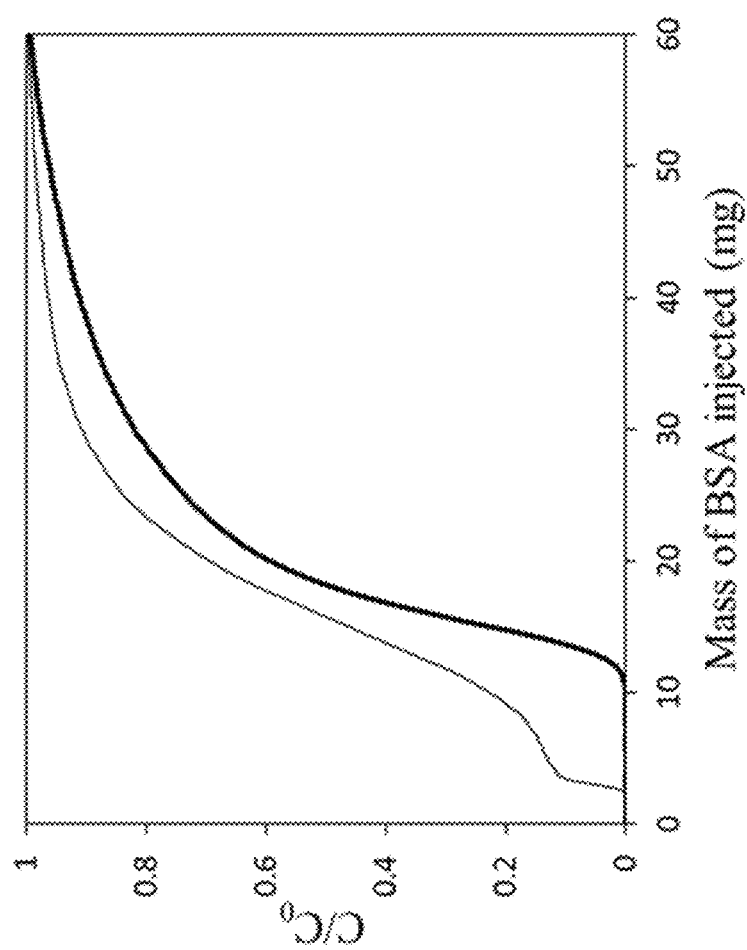
FIG. 26 is a graph showing breakthrough curves for adsorption of BSA on the anion-exchange membrane obtained using stacked-disk (thin line) and laterally-fed (thick line) membrane modules.
Figure 27:
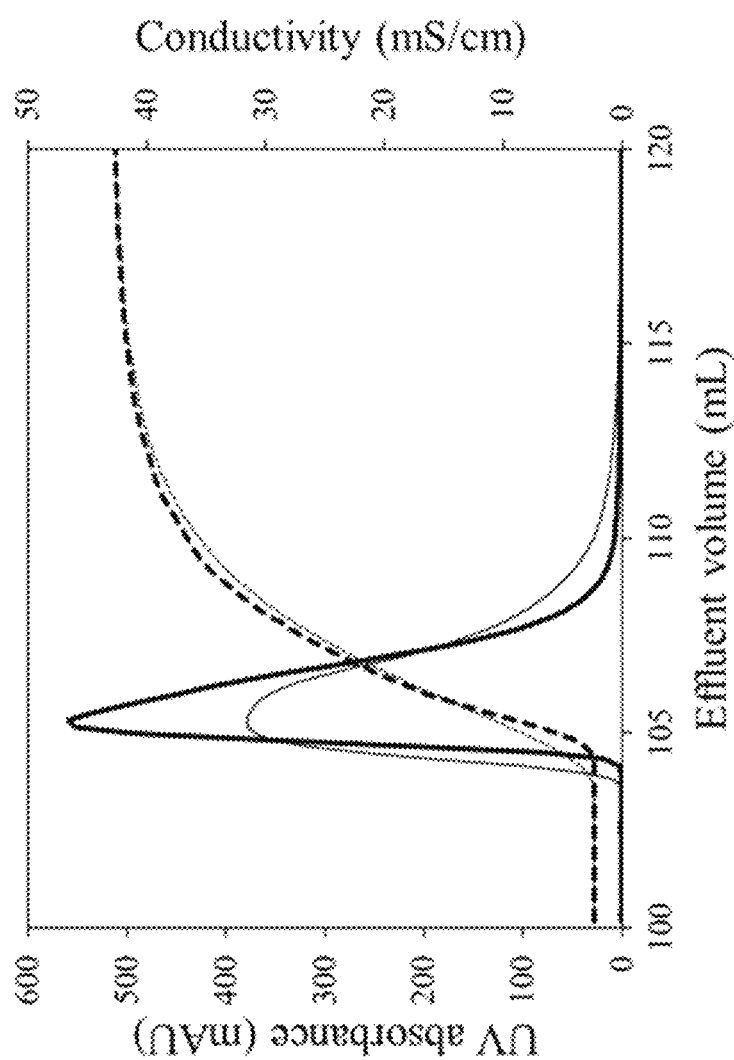
FIG. 27 is a graph showing BSA elution peaks and conductivity profiles obtained using stacked-disk (thin line and thin dashed line respectively) and laterally-fed (thick line and thick dashed line respectively) modules.

FIG. 26 shows the breakthrough curves for the laterally-fed and stacked-disk membrane modules, obtained by injecting 30 mL of 2 mg/mL BSA solution using a superloop. The void volume correction was made using data obtained from experiments carried out using the same volume of 0.5 mg/mL of lysozyme with the same superloop. The Sartobind Q membrane had identical bed volumes of 0.346 mL in the two devices. The incipient and 10% breakthrough BSA binding capacity obtained with the two membrane modules are reported in Table 3. These results clearly demonstrate how the design of the membrane module could have a profound impact on the utilization of membrane binding capacity. The quick saturation of the central regions of the membrane housed in the stacked-disk membrane module by BSA molecules resulted in an early breakthrough. By contrast, the breakthrough took place a lot later with the laterally-fed membrane module, the resultant incipient breakthrough BSA binding capacity being almost five times higher. The 10% breakthrough binding capacity obtained with the laterally-fed membrane module was 38.46 mg/mL which is an extremely high value for a single layer of membrane. The BSA elution peaks obtained in the above breakthrough experiments along with the corresponding conductivity profiles are shown in FIG. 27. The standard deviation and width at half height values for the BSA elution peaks obtained with the two modules are summarized in Table 4. As expected, the laterally-fed membrane module gave sharper and more symmetrical peak. Moreover, the sharper conductivity profile observed with the laterally-fed membrane module indicates its superior design. Broadening of peaks, in addition to being undesirable in multi-component separation processes, results in product dilution which increases bioseparation cost in large-scale separation processes.

TABLE 3

Incipient and 10% breakthrough BSA binding capacity obtained with as tacked disk device and a laterally fed device

|  | Incipient breakthrough binding capacity (mg/mL) | 10% breakthrough binding capacity (mg/mL) |
|---|---|---|
| Stacked-disk | 5.780 | 8.995 |
| Laterally-fed | 28.896 | 38.461 |
| Ratio | 4.999 | 4.276 |

TABLE 4 standard deviation and width at half height values for the BSA elution peaks obtained with a stacked disk device and a laterally fed device.

|  | Peak width at half height (mL) | Standard deviation |
|---|---|---|
| Stacked-disk | 2.84 | 1.206 |
| Laterally-fed | 2.05 | 0.871 |

Figure 28:
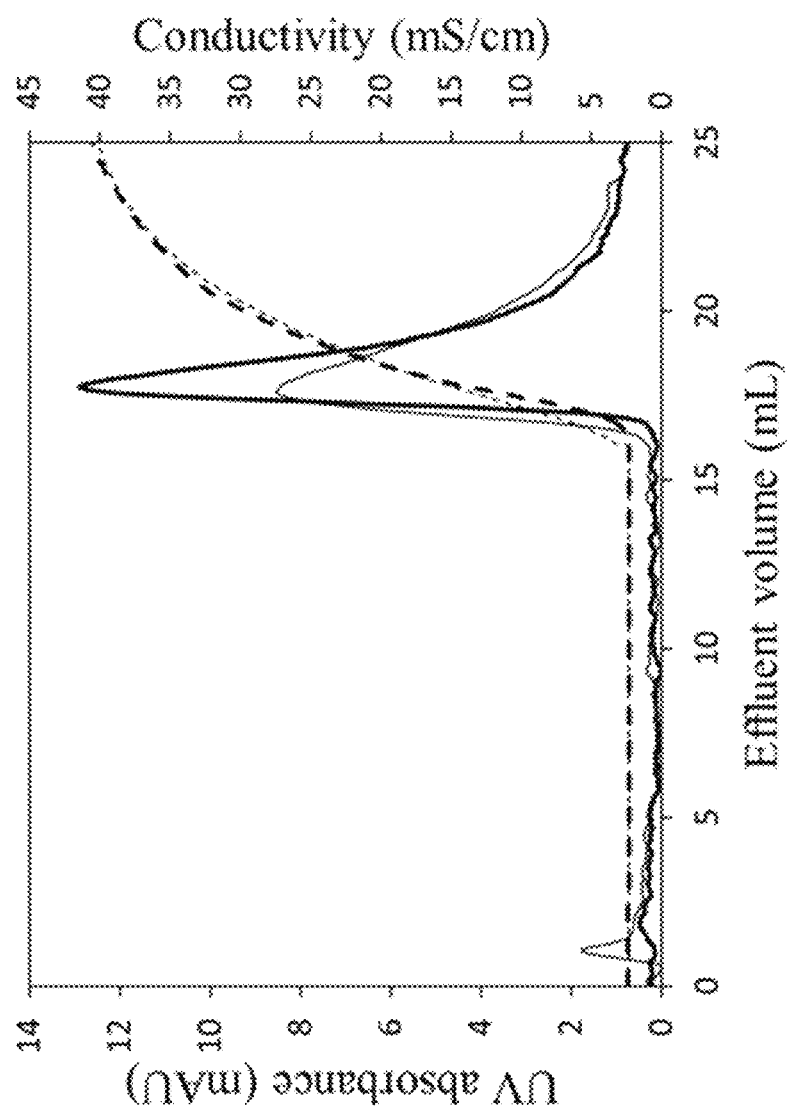
FIG. 28 is a graph showing BSA elution peaks and conductivity profiles obtained from pulse binding experiments carried out using stacked-disk (thin line and thin dashed line respectively) and laterally-fed (thick line and thick dashed line respectively) modules.

FIG. 28 shows the chromatograms obtained in pulse binding experiments carried out with both modules using 100 µL of 1 mg/ml BSA solution. While there was very little BSA flow-through with the laterally-fed membrane module, a significant peak, indicating incomplete protein capture was observed with the stacked-disk module. Table 5 summarizes the standard deviation and width at half height values for the BSA elution peaks obtained with the two modules. As in the experiments described in the previous paragraph, the BSA peak was sharper and more symmetric with the laterally-fed membrane module.

TABLE 5

Standard deviation and width at half height values for the BSA elution peaks obtained with a stacked disk device and a laterally fed device.

|  | Peak width at half height (mL) | Standard deviation |
|---|---|---|
| Stacked-disk | 2.749 | 1.167 |
| Laterally fed | 1.648 | 0.699 |

The above results clearly demonstrate the superiority of the laterally-fed membrane module over the conventional stacked-disk module. They also highlight the critical role played by the membrane module design on the efficiency of membrane binding capacity utilization. The laterally-fed design examined in the current study reduces the variability in solute path length within the device and thereby leads in more uniform usage of membrane. In order for the laterally-fed design feature to be effective, the following conditions have to be met. Firstly, the hydraulic resistance offered support material (woven wire mesh in this case) within which lateral flow distribution and collection takes place has to be lower than that offered by the membrane. Secondly, the resistance to lateral flow in the support material on both sides of the membrane has to be identical. A higher resistance on the feed side would result in greater flow in the membrane closer to the inlet while a higher resistance on the permeate side would result in greater flow closer to the outlet. Finally, the aspect (i.e. length to width) ratio of the device is quite important. A low aspect ratio could result in maldistribution with more lateral flow of feed taking place closer to the centerline of the support material. A very high aspect ratio on the other hand would result in poor utilization of membrane closer to the outlet due to increase in lateral resistance.

High-resolution protein purification: head-to-head comparison with a radial-flow device As the next step, a scaled-up, laterally-fed membrane device housing a stack of rectangular membranes was designed and its performance was compared with equivalent a radial flow membrane device (Sartobind S, Sartorius, Goettingen, Germany) having the same bed volume and bed height. Tracer experiments using salt were carried out in both step-input and pulse mode through which the residence time distribution of the devices were compared. Lysozyme was used for the single bind-and-elute experiments before conducting protein separations. Finally, ovalbumin, conalbumin, and lysozyme were used as model protein to run multi-component bind-and-elute experiments.

The prototype device designed for this study is shown in FIG. 1. The device consisted of two acrylic plates 3-D printed using Projet HD3000 (3D systems, Rock Hill, S.C., USA) which contained the rectangular feed and permeate channels (70 mm×20 mm). The channels were connected to the inlet and outlet ports through slanted tapered channels. The other two ports were used for priming and removing the bubbles prior to running experiments which were kept closed during the chromatography processes. The rectangular channels were filled with a single layer of wire mesh having approximately the same thickness with their depth (0.5 mm) which also helped reducing the dead volume of the system. The middle frame had the same outer dimension with the plates and was made with delrin. The thickness of the frame was equal to the bed height of the stack containing a slot with the same dimension of the membranes (70 mm×20 mm) on one side and tapered out on the other side providing enough space for gluing around the membranes. Cation exchange (18 layers) S membranes (Sartorius, Goettingen, Germany) were cut using a metal stamp and glued within the slot using RTV 108 adhesive.

The devices were connected to AKTA prime liquid chromatography system (GE healthcare Biosciences, QC, Canada) using PEEK tubing. The sanitary connectors on the radial-flow device were modified using delrin inserts which decreased the total dead volume of the device. The dead volume of both devices was measure with the volume of water required to fill them up. The values were 4.8 mL and 21.0 mL for the LFMC and radial-flow devices respectively.

Figure 29:
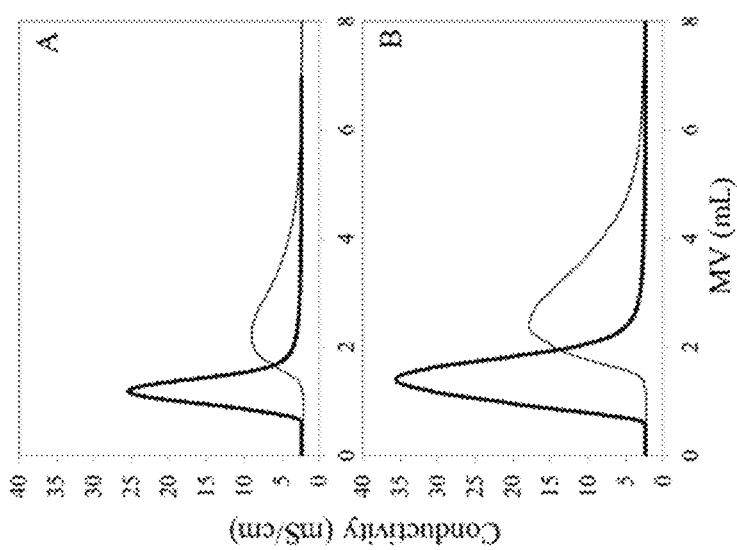
FIG. 29 is a graph showing salt tracer peaks obtained with the radial-flow (thin line) and the laterally-fed (thick line) membrane chromatography devices (membrane: Sartobind S; membrane bed volume: 7 mL; feed: 0.5 M NaCl; running buffer: 20 mM sodium phosphate, pH=7.0; flow rate: 10 mL/min; volume injected: 2 mL (A) and 5 mL (B))

The results for the salt tracer (0.5M NaCl) experiments in the pulse mode with 2 mL and 5 mL sample loop are shown in FIG. 29. Phosphate buffer (20 mM, pH 7) was used as the running buffer. For both pulse volumes, the conductivity peaks obtained from the LFMC device were sharper and more symmetrical whereas the ones from the radial-flow device had significant tailing. The peak width at half height, asymmetry parameter, and tailing factor are shown in Table 6. The results confirm poor flow distribution within the radial-flow device. Moreover, looking at the volumes at which the salt appeared in the permeate the value for the LFMC device being 4.7 mL corresponds very well with the dead volume of the device. This is while this value for the radial-flow device (8.8 mL) is much lower than the device dead volume. The results show severe variability in the flow path length and short-circuiting within the radial-flow device which results in low efficiencies in chromatographic separation.

TABLE 6

| FIG. | Loop size (mL) | Device | Peak width at half height (mL) | Asymmetry parameter | Tailing factor |
|---|---|---|---|---|---|
| 29A | 2.0 | Radial-flow | 12.19 | 3.03 | 2.33 |
|  |  | Laterally-fed | 3.72 | 1.33 | 1.34 |
| 29B | 5.0 | Radial-flow | 13.37 | 3.26 | 2.37 |
|  |  | Laterally-fed | 6.54 | 1.29 | 1.28 |

Figure 30:
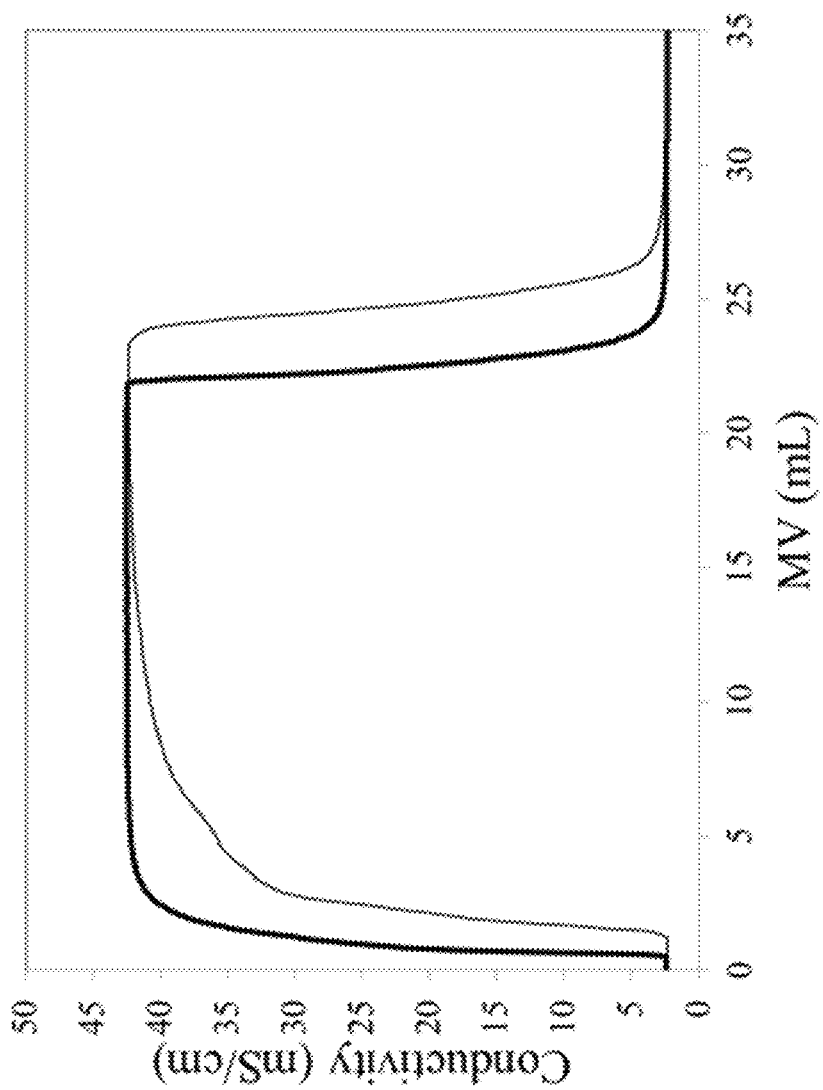
FIG. 30 is a graph showing salt breakthrough curves obtained with the radial-flow (thin line) and laterally-fed (thick line) membrane chromatography devices.

FIG. 30 shows the conductivity graphs obtained from both devices in the step-input mode with 150 mL of salt injection. The salt breakthrough obtained from the radial-flow device (20-120 mL) were shallow and jagged, indicating the poor flow distribution within the device which is also a result of large dead volume. On the other hand, the salt breakthrough obtained from the LFMC device was sharp with the incipient breakthrough matching the dead volume of the system which shows the uniformity in the flow path lengths and close to plug-flow behavior. This could be also inferred from comparing the salt conductivity decays within the devices.

Figure 31:
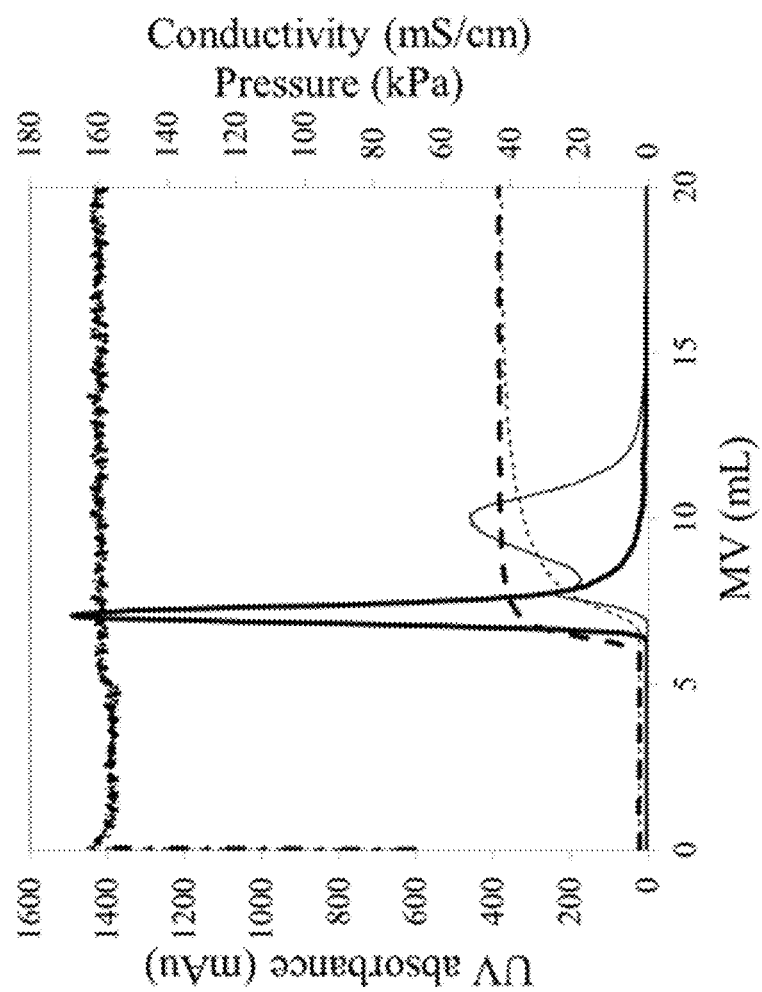
FIG. 31 is a graph showing lysozyme elution peaks obtained with the radial-flow (thin lines) and the laterally-fed (thick lines) membrane chromatography devices.
Figure 32:
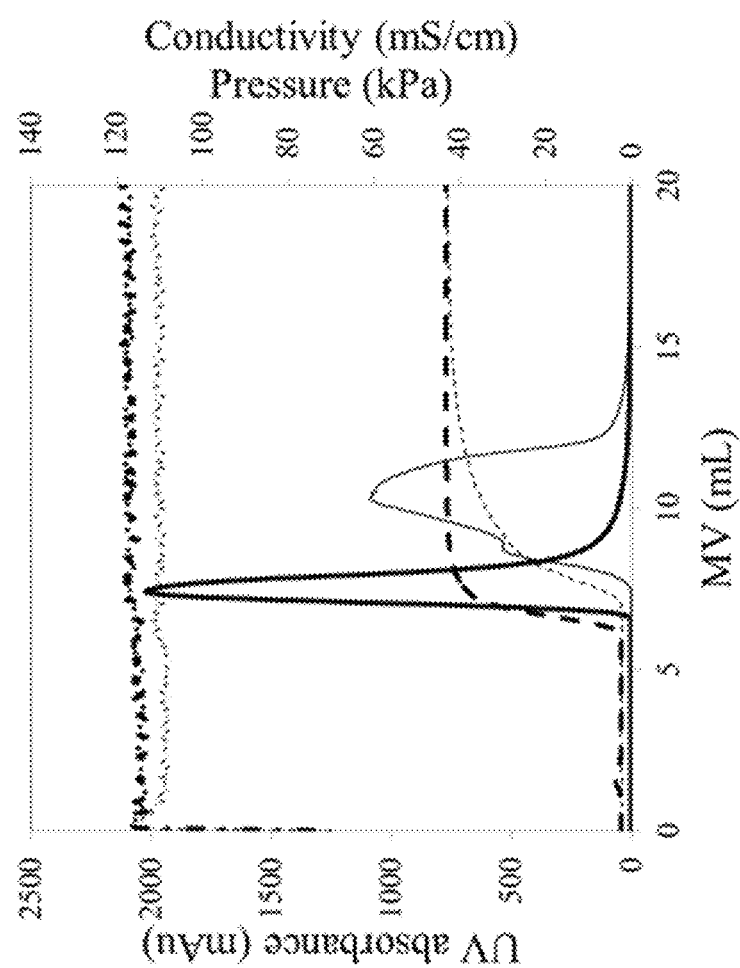
FIG. 32 is a graph showing lysozyme elution peaks obtained with the radial-flow (thin lines) and the laterally-fed (thick lines) membrane chromatography devices.
Figure 33:
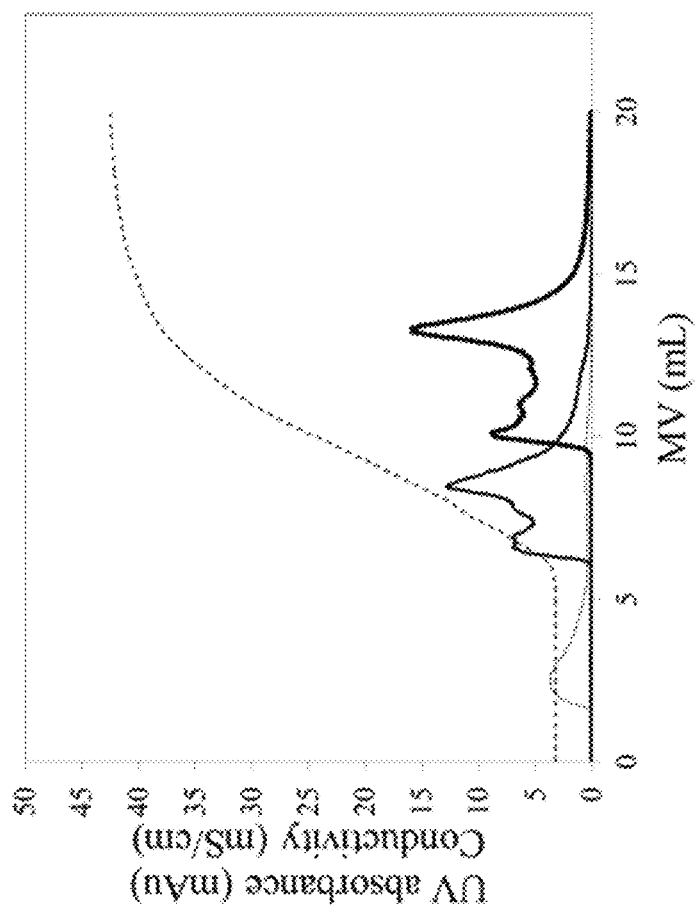
FIG. 33 is a graph showing single-protein peaks obtained with ovalbumin (thin line), conalbumin (medium line), and lysozyme (thick line) using the radial-flow device.

The results obtained from the bind-and-elute single protein (8 mg/mL lysozyme) experiments using 2 mL and 5 mL sample volumes are shown in FIGS. 31 and 30, respectively. Sodium phosphate buffer (20 mM, pH 7) was used as the binding buffer and the eluting buffer was the same buffer containing 0.5M NaCl. In both sets of experiments run with the LFMC device the eluted peaks were significantly sharper and more symmetrical. However, the peaks obtained from the radial flow device were not only broadened but also contained shoulder for a single protein which indicated the non-uniformity of protein binding and elution within the radial-flow device. In comparison, the samples obtained from the radial-flow device were much more diluted which is highly undesirable in large-scale separation processes. The peak width at half height values for both sets of experiments are available in Table.7 which clearly demonstrate the likelihood of excellent multi-component separation using the laterally-fed device. Further single protein experiments were carried out using ovalbumin (pI 4.5), conalbumin (pI 6.1), and lysozyme (pI 11.0) with 2 mL sample loops. Citrate buffer (20 mM, pH 5.5) was used as the binding buffer and the same buffer containing 0.5M NaCl was used as the eluting buffer. Based on the pI values of the proteins ovalbumin was expected to flow through while conalbumin and lysozyme could be separated using a linear gradient which confirmed the feasibility of separating the three proteins in a multi-component separation format. FIG. 33 shows the chromatograms obtained from the three proteins using a 40 mL linear gradient. The flow through ovalbumin peak was very broad and the eluting peaks were jagged. The results indicated that it would not be possible to fully resolve conalbumin and lysozyme with 40 mL gradient with the radial-flow device.

TABLE 7

| Loop size (mL) | Device | Peak width at half height (mL) |
| --- | --- | --- |
| 2.0 | Radial-flow | 15.81 |
|  | Laterally-fed | 4.21 |
| 5.0 | Radial-flow | 18.00 |
|  | Laterally-fed | 6.43 |

Figure 34:
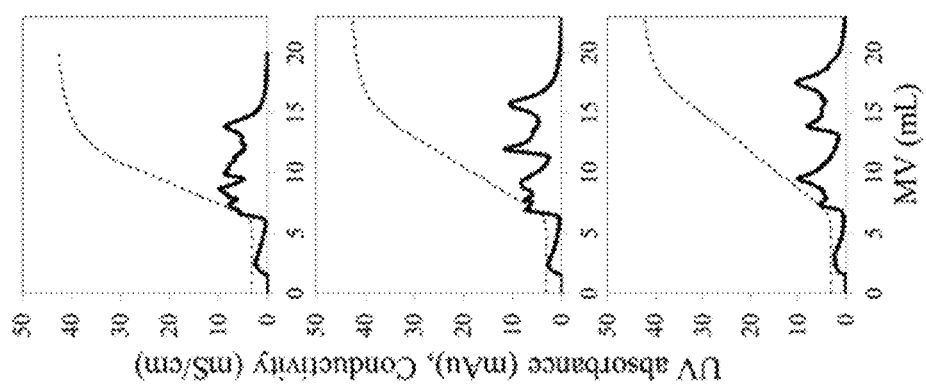
FIG. 34 is a graph showing multi-component separation peaks obtained with the radial-flow device using 40 mL (A), 60 mL (B) and 80 mL (C) linear gradients.

FIG. 34 shows the results obtained from the multi-component separation of the three abovementioned proteins using the radial-flow device. Near baseline resolution was achieved with 80 mL gradients. The flow through peak was very broad and the eluting peaks were broad and jagged and 25 membrane bed volume of buffer was required for the whole separation.

Figure 35:
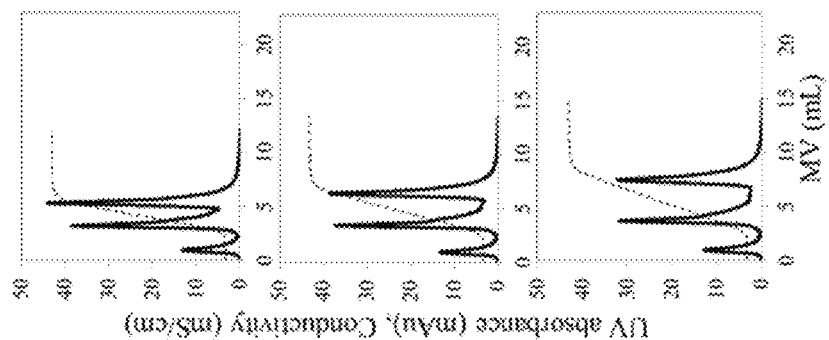
FIG. 35 is a graph showing multi-component separation peaks obtained with the laterally device using 20 mL (A), 30 mL (B) and 40 mL (C) linear gradients.
Figure 36:
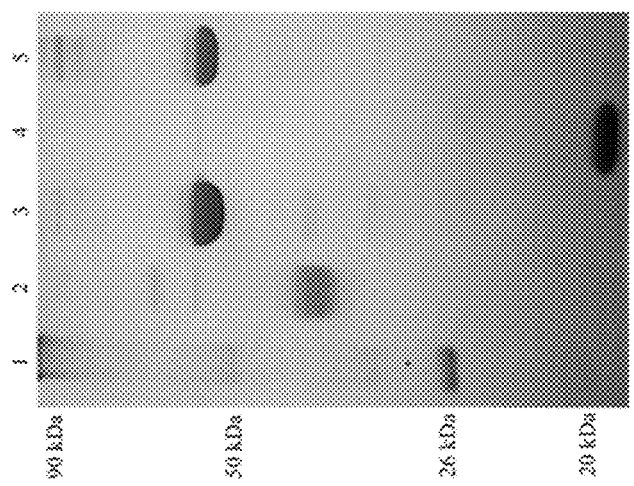
FIG. 36 is a graph showing an SDS-PAGE analysis of samples obtained from the multi-component protein separation experiment carried out with the laterally-fed device using 40 mL linear gradient elution.

FIG. 35 shows the same results obtained from the LFMC device with three gradients of 20, 30, and 40 mL gradients. The ovalbumin flow through peak was much sharper compared to the one acquired from the radial-flow device. Therefore, the gradient elution was commenced 5 mL after the sample was injected; the value which was 4 times lower compared to the one required for the radial-flow device. The eluting conalbumin and lysozyme peaks were much sharper and taller and therefore even 30 mL gradient gave almost near baseline resolution. The three model proteins were fractionated in 10 membrane bed volumes which would make a great impact in the large-scale application through drastic decrease in the buffer consumption, diminishing the processing time, and avoiding sample dilutions. The peaks obtained from the 40 mL gradient experiments were collected and analyzed with SDS-PAGE. The bands clearly demonstrate excellent separation of the proteins (see FIG. 33).

The results demonstrate the suitability of the LFMC device for conducting high-resolution, multi-component separations in the bind-and-elute format. The LFMC device offers simple design and fabrication and its flat shape versus the cylindrical shape of the radial-flow devices offer much lower footprints.

While the above description provides examples of one or more methods or systems, it will be appreciated that other methods or systems may be within the scope of the claims as interpreted by one of skill in the art.

What is claimed is:

1. A method of forming a frame around a membrane stack for a laterally-fed membrane chromatography device, the method comprising:
    placing a membrane stack having one or more membrane layers on a bottom surface of a body of a master mold with a membrane stack bottom surface extending across a membrane stack length and a membrane stack width of the membrane stack and the membrane stack bottom surface in full contact with the bottom surface of the body of the master mold, the body having opposed side walls and opposed end walls, the opposed side walls spaced apart by a distance greater than a length of the membrane stack, the opposed end walls spaced apart by a distance greater than a width of the membrane stack;
    placing a cap on the body of the master mold to enclose the membrane stack in the master mold, the cap having at least one opening for injecting a material into a space defined by the end walls of the master mold, the side walls of the master mold, end walls of the membrane stack, side walls of the membrane stack, the bottom surface of the body and an inner surface of the cap, an inner surface of the cap resting on and covering a top surface of the membrane stack to provide a downward force across the top surface of the membrane stack to inhibit lateral movement of the membrane stack;
    injecting the material into the space around the membrane stack; and curing the material to form a frame around the membrane stack.

2. The method of claim 1 further comprising removing the cap piece and the master mold from the membrane stack and frame.

3. The method of claim 1, wherein the curing the material includes cooling the material below a curing temperature.

4. The method of claim 1, wherein the material is a thermoplastic polymer that is injected into the master mold as a liquid and hardens when cooled.

5. The method of claim 1, wherein the curing the material exposing the material to ultraviolet light.

6. The method of claim 1, wherein the placing the cap on the body of the master mold includes resting the inner surface of the cap on an abutment member of the body to support the cap above a top surface of the membrane stack.

7. The method of claim 1, wherein the placing the membrane stack on the bottom surface of the body includes coupling the membrane stack to the bottom surface of the body.

8. The method of claim 1, wherein the placing the membrane stack on the bottom surface of the body includes placing the membrane stack between retention ridges of the body to couple the membrane stack to the body.

9. The method of claim 1, wherein the placing the membrane stack on the bottom surface of the master mold includes positioning the membrane stack on the bottom surface so the end walls of the membrane stack are adjacent to the end walls of the body and the side walls of the membrane stack are adjacent to the side walls of the body.

10. The method of claim 1, wherein during the injecting the material into the space around the membrane stack, the material is contained within the space around the membrane stack.

11. The method of claim 1, wherein during the curing of the material, the material adheres to the side wall and end walls of the membrane stack to form a frame around the membrane stack.

12. The method of claim 1, wherein the top surface of the membrane stack extends across the membrane stack length and the membrane stack width, and placing a cap on the body of the master mold to enclose the membrane stack in the master mold includes placing the inner surface of the cap in full contact with the top surface of the membrane stack.

* * * * *